US010329437B2

(12) United States Patent
Kaylo et al.

(10) Patent No.: US 10,329,437 B2
(45) Date of Patent: Jun. 25, 2019

(54) ELECTRODEPOSITABLE COATING COMPOSITION HAVING IMPROVED CRATER CONTROL

(71) Applicant: PPG Industries Ohio, Inc., Cleveland, OH (US)

(72) Inventors: Alan J. Kaylo, Glenshaw, PA (US); Venkatachalam Eswarakrishnan, Allison Park, PA (US); Jo-Ann E. Bice, Allison Park, PA (US); Craig A. Wilson, Allison Park, PA (US); Chester J. Szymanski, Allison Park, PA (US); Alycia Lewand, Irwin, PA (US); Joseph R. Swanger, Natrona Heights, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/637,157

(22) Filed: Jun. 29, 2017

(65) Prior Publication Data
US 2018/0002542 A1 Jan. 4, 2018

Related U.S. Application Data

(60) Provisional application No. 62/356,843, filed on Jun. 30, 2016.

(51) Int. Cl.
| | | |
|---|---|---|
| C09D 5/44 | (2006.01) | |
| C08G 18/00 | (2006.01) | |
| C08G 65/08 | (2006.01) | |
| C08G 65/26 | (2006.01) | |
| C08L 71/02 | (2006.01) | |
| C09D 5/00 | (2006.01) | |

(52) U.S. Cl.
CPC ........... C09D 5/443 (2013.01); C08G 18/003 (2013.01); C08G 65/08 (2013.01); C08G 65/2621 (2013.01); C08L 71/02 (2013.01); C09D 5/00 (2013.01)

(58) Field of Classification Search
CPC ........ C09D 5/443; C08L 18/003; C08L 65/08
USPC ....................................................... 525/409
See application file for complete search history.

(56) References Cited

U.S. PATENT DOCUMENTS

| | | | |
|---|---|---|---|
| 3,516,913 A | 6/1970 | Sekmakas et al. | |
| 3,699,016 A | 10/1972 | Beach et al. | |
| 3,984,382 A | 10/1976 | Parekh et al. | |
| 4,397,990 A | 8/1983 | Kooymans et al. | |
| 4,539,385 A | 9/1985 | Geist et al. | |
| 4,730,010 A | 3/1988 | Tsuchiya et al. | |
| 4,730,011 A | 3/1988 | Loch et al. | |
| 5,070,149 A | 12/1991 | DeBroy et al. | |
| 5,086,091 A | 2/1992 | Geist et al. | |
| 5,591,788 A | 1/1997 | Anderson et al. | |
| 6,462,106 B2 * | 10/2002 | Shirakawa ........... | C08G 18/581 523/404 |
| 6,933,381 B2 | 8/2005 | Mallon et al. | |
| 7,812,106 B2 | 10/2010 | Breuer et al. | |
| 2004/0069637 A1* | 4/2004 | Eswarakrishnan ......................... | C08G 18/0814 204/489 |
| 2006/0121204 A1 | 6/2006 | Nakae et al. | |
| 2007/0012569 A1 | 1/2007 | Mihara et al. | |
| 2014/0274660 A1 | 9/2014 | Kabir et al. | |

FOREIGN PATENT DOCUMENTS

| | | | |
|---|---|---|---|
| CN | 1038806 A | 1/1990 | |
| DE | 2129271 A1 | 12/1971 | |
| EP | 230031 A1 | 7/1987 | |
| EP | 269102 A2 | 6/1988 | |
| EP | 644245 A2 | 3/1995 | |
| JP | H01182376 A | 7/1989 | |
| JP | H01182377 A | 7/1989 | |
| JP | H11080623 A | 3/1999 | |
| JP | 2002058906 A | 2/2002 | |
| JP | 2002060682 A | 2/2002 | |
| JP | 2002126404 A | 5/2002 | |
| JP | 3799429 B2 | 7/2006 | |
| JP | 2007119653 A | 5/2007 | |
| JP | 3991293 B2 | 10/2007 | |
| JP | 2009001686 A | 1/2008 | |
| JP | 2014233721 A | 12/2014 | |
| WO | 2011013170 A1 | 2/2011 | |
| WO | WO 2017/083380 A1 * | 5/2017 | ............. C08G 18/48 |

\* cited by examiner

*Primary Examiner* — Fred M Teskin
(74) *Attorney, Agent, or Firm* — Charles M. Yeomans

(57) ABSTRACT

The present invention is directed towards an electrodepositable coating composition comprising a polybutylene oxide polymer, an ionic film-forming polymer having functional groups, and a curing agent that is reactive with functional groups on the film-forming polymer. Also disclosed are methods of making the electrodepositable coating composition. Also disclosed are substrates treated with the electrodepositable coating composition.

23 Claims, 10 Drawing Sheets

Rating 2

Rating 8

Rating 9

Rating 10

ELECTRODEPOSITABLE COATING COMPOSITION HAVING IMPROVED CRATER CONTROL

CROSS-REFERENCE TO RELATED APPLICATIONS

This application claims the benefit of U.S. Provisional Patent Application Ser. No. 62/356,843, filed on Jun. 30, 2016, incorporated herein by reference.

FIELD OF THE INVENTION

The present invention is directed towards an electrodepositable coating composition.

BACKGROUND INFORMATION

Oil contamination on substrate surfaces is problematic for electrodepositable coating compositions. Oil deposits, such as oils used in automotive assembly lines, result in the formation of defects in the cured coating in the form of craters. These craters form when the electrodepositable coating composition de-wets from the area around where the oil was deposited and the coating may cure around the oil deposit. The formation of craters affects both the smoothness and appearance of the cured coating and requires extra processing steps, such as sanding, to achieve the desired coating finish.

SUMMARY OF THE INVENTION

Disclosed is an electrodepositable coating composition comprising: a polybutylene oxide polymer; an ionic film-forming polymer having functional groups; and a curing agent that is reactive with functional groups on the film-forming polymer.

The present invention also discloses methods of coating a substrate with an electrodepositable coating composition comprising a polybutylene oxide polymer, an ionic film-forming polymer having functional groups, and a curing agent that is reactive with functional groups on the film-forming polymer also are disclosed.

The present invention further discloses substrates coated with an electrodepositable coating composition comprising a polybutylene oxide polymer, an ionic film-forming polymer having functional groups, and a curing agent that is reactive with functional groups on the film-forming polymer also are disclosed.

DETAILED DESCRIPTION OF THE INVENTION

Figure 1A:
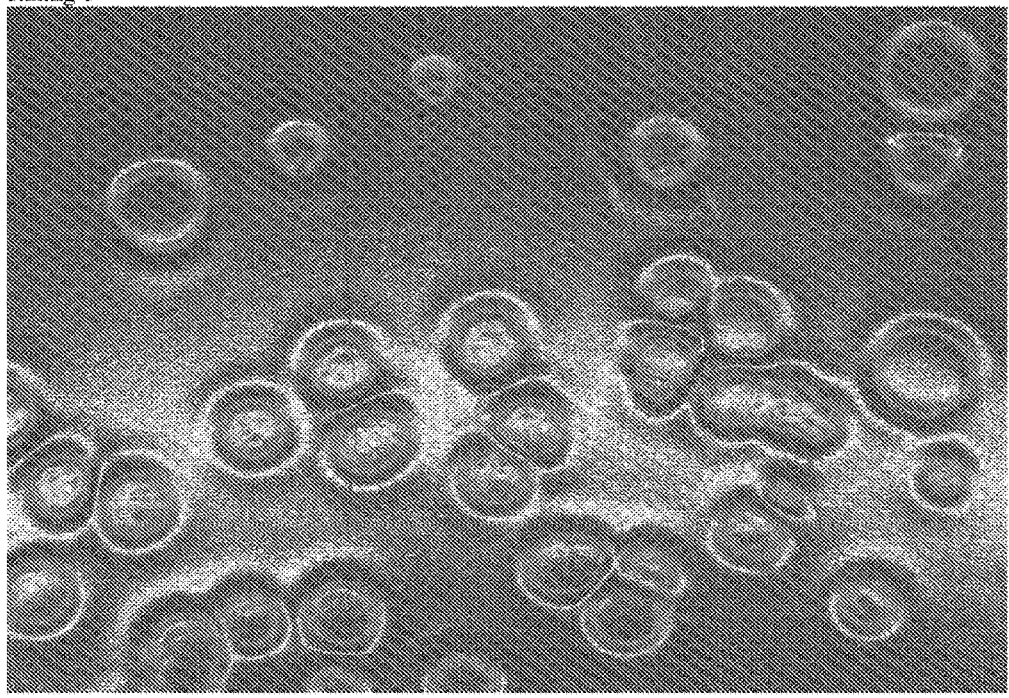
FIG. 1 is ten photographs of representative coated panels labeled FIG. 1A through FIG. 1J that correspond to a crater-rating scale of from 1 to 10, respectively, with a rating of 1 representing significantly deep craters formed in the cured coating, a rating of 2-9 representing a decreasing depth of craters formed in the cured coating as the rating value increases, and a rating of 10 having no craters formed in the cured coating, as demonstrated in the photographs of the representative panels.

The present invention is directed to an electrodepositable coating composition comprising, or in some cases consisting of, or in some cases consisting essentially of, a polybutylene oxide polymer, a cationic film-forming resin, and a curing agent dispersed in an aqueous medium. According to the present invention, the polybutylene oxide polymer which may comprise a copolymer of butylene oxide and propylene oxide, such as, for example, a block, gradient, alternate or random copolymer. According to the present invention, the molar ratio of butylene oxide to propylene oxide may be at least 1:1, such as at least 3:1, such as at least 5:1, and in some instances, may be no more than 50:1, such as no more than 30:1, such as no more than 20:1. According to the present invention, the molar ratio of butylene oxide to propylene oxide may be 1:1 to 50:1, such as 3:1 to 30:1, such as 5:1 to 20:1.

According to the present invention, the polybutylene oxide polymer comprises at least two hydroxyl functional groups, and may be difunctional, trifunctional, tetrafunctional, or more. As used herein, a "hydroxyl functional group" comprises an —OH group. For clarity, the polybutylene oxide polymer may comprise additional functional groups in addition to the hydroxyl functional group(s). As used herein, "difunctional," when used with respect to the number of hydroxyl functional groups a particular monomer or polymer comprises, means a monomer or polymer comprising two (2) hydroxyl functional groups per molecule. As used herein, "trifunctional," when used with respect to the number of hydroxyl functional groups a particular monomer or polymer comprises, means a monomer or polymer comprising three (3) hydroxyl functional groups per molecule. As used herein, "tetrafunctional," when used with respect to the number of hydroxyl functional groups a particular monomer or polymer comprises, means a monomer or polymer comprising four (4) hydroxyl functional groups per molecule.

According to the present invention, the hydroxyl equivalent weight of the polybutylene oxide polymer may be at least 100 g/mol, such as at least 200 g/mol, such as at least 400 g/mol, and may be no more than 2,000 g/mol, such as no more than 1,000 g/mol, such as no more than 800 g/mol. The hydroxyl equivalent weight of the polybutylene oxide polymer may be 100 g/mol to 2,000 g/mol, such as 200 g/mol to 1,000 g/mol, such as 400 g/mol to 800 g/mol. As used herein, the "hydroxyl equivalent weight" is determined by dividing the molecular weight of the polybutylene oxide polymer by the number of hydroxyl groups present in the polybutylene oxide polymer.

According to the present invention, the polybutylene oxide polymer may be present in the electrodepositable coating composition in an amount of at least 0.1% by weight based on the total weight of the resin blend solids, such as at least 0.5% by weight, such as at least 0.75% by weight, and in some instances, may be present in the electrodepositable coating composition in an amount of no more than 10% by weight based on the total weight of the resin blend solids, such as no more than least 4% by weight, such as no more than 3% by weight. According to the present invention, the polybutylene oxide polymer may be present in the electrodepositable coating composition in an amount of at 0.1% by weight to 10% by weight based on the total weight of the resin blend solids, such as 0.5% by weight to 4% by weight, such as 0.75% by weight to 3% by weight.

According to the present invention, the polybutylene oxide polymer may have a z-average molecular weight (Mz) of at least 200 g/mol, such as at least 400 g/mol, such as at least 600 g/mol, and may be no more than 5,000 g/mol, such as no more than 3,000 g/mol, such as no more than 2,000 g/mol. According to the present invention, the polybutylene oxide polymer may have a z-average molecular weight of 200 g/mol to 5,000 g/mol, such as 400 g/mol to 3,000 g/mol, such as 600 g/mol to 2,000 g/mol. As used herein, with respect to polymers having a z-average molecular weight ($M_z$) of less than 900,000, the term "z-average molecular weight ($M_z$)" means the z-average molecular weight ($M_z$) as determined by Gel Permeation Chromatography using Waters 2695 separation module with a Waters 410 differential refractometer (RI detector), polystyrene standards having molecular weights of from approximately 500 g/mol to 900,000 g/mol, tetrahydrofuran (THF) with lithium bromide (LiBr) as the eluent at a flow rate of 0.5 mL/min, and one Asahipak GF-510 HQ column for separation.

According to the present invention, the electrodepositable coating composition may further comprise a polyetheramine-adduct comprising an ungelled ionic reaction product prepared from reactants comprising: (a) a reaction product prepared from reactants comprising: (1) a polyol; and (2) an epoxy functional material; and (b) a polyetheramine.

Examples of suitable polyols useful for forming the ungelled ionic reaction product include resorcinol, dihydroxy benzene, aliphatic, cycloaliphatic or aralaphatic hydroxyl containing compounds, such as ethylene glycol, propylene glycol, bisphenol A, dihydroxyl cyclohexane, dimethylol cyclohexane, or combinations thereof. The polyol may be present in the polyetheramine adduct in an amount of about 0% to 20% by weight based on the total weight of the reactants that form the polyester reaction product, such as 0% to 15% by weight.

Examples of suitable epoxy-functional materials useful for forming the ungelled ionic reaction product contain at least one epoxy group in the molecule, such as di- or polyglycidyl ethers of polyhydric alcohols, such as a polyglycidyl ether of bisphenol A. Suitable epoxy-functional materials may have an epoxy equivalent weight ranging from about 90 to about 2000, as measured by titration with perchloric acid using methyl violet as an indicator. The epoxy-functional material may comprise about 10% to 40% by weight based on the total weight of the epoxy functional polyester, such as 15% to 35% by weight of the epoxy functional material is combined or reacted with the polyether described above to form the epoxy functional polyester.

According to the present invention, the polyetheramine adduct may be formed by reacting the ungelled ionic reaction product with at least one polyetheramine such as one characterized by propylene oxide, ethylene oxide, or mixed propylene oxide and ethylene oxide repeating units in their respective structures, such as, for example, one of the Jeffamine series products (commercially available from Huntsman Corporation). Examples of such polyetheramines include aminated propoxylated pentaerythritols, such as Jeffamine XTJ-616, and those represented by Formulas (I) through (III).

According to Formula (I) of the present invention the polyetheramine may comprise or represent:

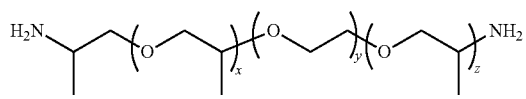
(I)

wherein y=0-39, x+z=1-68.

Suitable polyetheramines represented by Formula (I) include, but are not limited to, amine-terminated polyethylene glycol such as Huntsman Corporation Jeffamine ED series, such as Jeffamine HK-511, Jeffamine ED-600, Jeffamine ED-900 and Jeffamine ED-2003, and amine-terminated polypropylene glycol such as Huntsman Corporation Jeffamine D series, such as Jeffamine D-230, Jeffamine D-400, Jeffamine D-2000 and Jeffamine D-4000.

According to Formula (II) of the present invention the polyetheramine may comprise or represent:

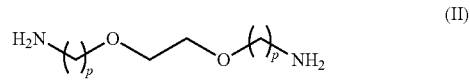
(II)

wherein each p independently is 2 or 3.

Suitable polyetheramines represented by Formula (II) include, but are not limited to, amine-terminated polyethylene glycol based diamine, such as Huntsman Corporation Jeffamine EDR series, such as Jeffamine EDR-148 and Jeffamine EDR-176.

According to Formula (III) of the present invention the polyetheramine may comprise or represent:

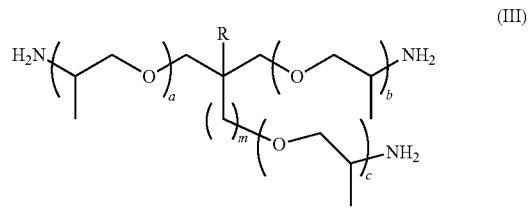
(III)

wherein R is H or $C_2H_5$, m=0 or 1, a+b+c=5-85.

Suitable polyetheramines represented by Formula (III) include, but are not limited to, amine-terminated propoxylated trimethylolpropane or glycerol, such as Huntsman Corporation Jeffamine T series, such as Jeffamine T-403, Jeffamine T-3000 and Jeffamine T-5000.

Further examples of the polyetheramine-adduct are those described in U.S. Pat. Nos. 4,420,574, and 4,423,166, which are incorporated herein by reference.

According to the present invention, the polyetheramine-adduct may be present in the electrodepositable coating composition in an amount of at least 3% by weight based on the total weight of the resin blend solids, such as at least 5% by weight, such as at least 10% by weight, such as at least 15% by weight, and no more than 20% by weight, such as no more than 15% by weight, such as no more than 10% by weight, such as no more than 5% by weight. The polyetheramine may be present in the electrodepositable coating composition in an amount of 3% to 20% by weight based on the total weight of the resin blend solids, such as 5% to 15% by weight, such as 5% to 10% by weight.

According to the present invention, the electrodepositable coating composition may further comprise crater control additives which may be incorporated into the coating composition, such as, for example, a polyamine-dialdehyde adduct comprising, or in some cases consisting of, or in some cases consisting essentially of, a polymerization product of a polyamine and a dialdehyde.

According to the present invention, a polyamine and a dialdehyde may be polymerized to form the polymerization product. As used herein, "polyamine" includes compounds that include at least two amino groups, and the amino groups may comprise primary or secondary amino groups. As used herein, "primary amino groups" are derivatives of ammonia wherein one hydrogen atom has been replaced by an alkyl or aryl group and "secondary amino groups" are derivatives of ammonia wherein two hydrogen atoms have been replaced by alkyl or aryl groups. As used herein, "alkyl" refers to a hydrocarbon chain that may be linear or branched and may comprise one or more hydrocarbon rings that are not aromatic. As used herein, "aryl" refers to a hydrocarbon having a delocalized conjugated π-system with alternating double and single bonds between carbon atoms forming one or more coplanar hydrocarbon rings.

According to the present invention, the polyamine may comprise a cationic amine-functionalized resin, a polyetheramine, or combinations thereof. The cationic amine-functionalized resin may be derived from a polyepoxide. For example, the cationic amine-functionalized resin can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. Other hydroxyl-group containing materials that may comprise the cationic amine-functionalized resin include adducts of phenolic hydroxyl group-containing materials and alkylene oxides. The reaction product can then be reacted with a cationic salt group former to produce the cationic amine-functionalized resin.

According to the present invention, the polyamine also may comprise a polyetheramine which may be the same as those described above, characterized by propylene oxide, ethylene oxide, or mixed propylene oxide and ethylene oxide repeating units in their respective structures, such as, for example, one of the Jeffamine series products (commercially available from Huntsman Corporation). Examples of such polyetheramines include aminated propoxylated pentaerythritols, such as Jeffamine XTJ-616, and those represented by Formulas (I) through (III) above.

The z-average molecular weight ($M_z$) of the polyamine may be at least 5,000 g/mol, such as at least 7,000 g/mol, such as at least 10,000 g/mol, and may be no more than 300,000 g/mol, such as no more than 100,000 g/mol, such as no more than 15,000 g/mol. The molecular weight of the polyamine may be 5,000 g/mol to 300,000 g/mol, such as 7,000 g/mol to 100,000 g/mol, such as 10,000 g/mol to 15,000 g/mol. As used herein, with respect to polymers having a z-average molecular weight ($M_z$) of less than 900,000, the term "z-average molecular weight ($M_z$)" means the z-average molecular weight ($M_z$) as determined by Gel Permeation Chromatography using Waters 2695 separation module with a Waters 410 differential refractometer (RI detector), polystyrene standards having molecular weights of from approximately 500 g/mol to 900,000 g/mol, dimethylformamide (DMF) with lithium bromide (LiBr) as the eluent at a flow rate of 0.5 mL/min, and one Asahipak GF-510 HQ column for separation. With respect to polymers having a z-average molecular weight ($M_z$) of greater than 900,000 g/mol, the term "z-average molecular weight ($M_z$)" means the theoretical z-average molecular weight ($M_z$) as determined by Gel Permeation Chromatography ("GPC") using Waters 2695 separation module with a Waters 410 differential refractometer (RI detector), polystyrene standards having molecular weights of from approximately 500 g/mol to 3,000,000 g/mol, dimethylformamide (DMF) with lithium bromide (LiBr) as the eluent at a flow rate of 0.5 mL/min, and one Asahipak GF-7M HQ column for separation.

The amine equivalent weight of the polyamine may be at least 200 g/amine, such as at least 400 g/amine, such as at least 450 g/amine, and may be no more than 5,000 g/amine, such as no more than 2,000 g/amine, such as no more than 600 g/amine. The amine equivalent weight may be from 200 g/amine to 5,000 g/amine, such as 400 g/amine to 2,000 g/amine, such as 450 g/amine to 600 g/amine. As used herein, the "amine equivalent weight" is determined by dividing the molecular weight of the amine-containing compound by the number of amino groups present in the polyamine.

As described above, according to the present invention, the polyamine may be polymerized with a dialdehyde to form the polyamine-dialdehyde adduct. The dialdehyde may comprise two aldehyde functional groups per molecule. As used herein, an "aldehyde functional group" comprises the structure R—CHO, wherein the carbon atom of a carbonyl is bonded to a hydrogen atom and an alkyl group represented by the letter R. Suitable dialdehyde compounds include, but are not limited to, glyoxal, glutaraldehyde and combinations thereof.

According to the present invention, the polymerization of the polyamine with the dialdehyde to form the polyamine-dialdehyde adduct may be performed in an aqueous medium at a pH of less than 7, such as less than 6.5, and may be at a pH of at least 2, such as at least 5. According to the present invention, the polymerization of the polyamine with the dialdehyde to form the polyamine-dialdehyde adduct may be performed in an aqueous medium at a pH of 2 to 7, such as 5 to 6.5.

According to the present invention, the polyamine-dialdehyde adduct may have a z-average molecular weight (Mz) of at least 100,000 g/mol, such as at least 300,000 g/mol, such as at least 400,000 g/mol, and may be no more than 1,000,000 g/mol, such as no more than 700,000 g/mol, such as no more than 600,000 g/mol. According to the present invention, the polyamine-dialdehyde adduct may have a z-average molecular weight of 100,000 g/mol to 1,000,000 g/mol, such as 300,000 g/mol to 700,000 g/mol, such as 400,000 g/mol to 600,000 g/mol. One of skill in the art recognizes that there are inherent limitations on the measurement of molecular weight for high molecular weight compounds, such as compounds having a molecular weight over 900,000 g/mol. Accordingly, although the theoretical z-average molecular weight ($M_z$) of the polyamine-dialdehyde adduct is expected to increase as the ratio of dialdehyde to polyamine approaches 1 (i.e., the ratio of dialdehyde to polyamine is ≤1), the measured molecular weight may not reflect that due to these limitations in the measurement standards. This result is expected, not because the adduct does not have an increased molecular weight at the higher stoichiometric ratio, but because it is difficult to measure the molecular weight of such high molecular weight compounds according to the present analytical methods. Specifically, as GPC is a method of size exclusion chromatography, higher molecular weight polymers elute from the column more quickly than lower molecular weight polymers. Once the majority of the polymers exceed a certain molecular weight, the polymer molecules elute too quickly from the column to determine an accurate molecular weight.

As discussed in more detail below, the polyamine-dialdehyde adduct may function in the electrodepositable coating composition as either the main vehicle, as an additive that is added to the electrodepositable coating composition as a pre-blended component of the resin blend, or as both a portion of the main vehicle and as an additive.

As described above, according to the present invention, the polyamine-dialdehyde adduct may function in the electrodepositable coating composition as the main vehicle. In such instances, the polyamine-dialdehyde adduct may be present in the electrodepositable coating composition in an amount of at least 50% by weight based on the total weight of the resin blend solids, such as at least 70%, such as at least 75%, and in some instances, may be present in the electrodepositable coating composition in an amount of no more than 95% by weight based on the total weight of the resin blend solids, such as no more than 90%, such as no more than 85%. In some instances, when the polyamine-dialdehyde adduct functions as the main vehicle, the polyamine-dialdehyde adduct may be present in the electrodepositable coating composition in an amount of 50% to 95% by weight based on the total amount of resin blend solids, such as 70% to 90%, such as 75% to 85%.

According to the present invention, the polyamine-dialdehyde adduct may function as the main vehicle. In such instances, the stoichiometric ratio of aldehyde functional groups of the dialdehyde compound to primary and/or secondary amino functional groups from the polyamine may be at least 2:1 to form the polymerization product, such as at least 3:1, such as at least 4:1, and in some instances may be no more than 20:1, such as no more than 15:1, such as no more than 14:1. According to the present invention, the stoichiometric ratio of aldehyde functional groups of the dialdehyde compound to primary and/or second amino functional groups from the polyamine may be 2:1 to 20:1, such as 3:1 to 15:1, such as 4:1 to 14:1.

According to the present invention, the polyamine-dialdehyde adduct also may function in the electrodepositable coating composition as an additive. In such instances, according to the present invention, the polyamine-dialdehyde adduct may be present in the electrodepositable coating composition in an amount of at least 0.2% by weight based on the total weight of the resin blend solids, such as at least 0.5%, such as at least 0.75%, such as at least 1%, such as at least 2%, such as at least 4%, such as at least 10%, and no more than 20% by weight based on the total weight of the resin blend solids, such as no more than 15%, such as no more than 10%, such as no more than 4%. The polyamine-dialdehyde adduct may be present in the electrodepositable coating composition in an amount of 0.2% to 20% by weight based on the total amount of resin blend solids, such as 0.5% to 15%, such as 0.75% to 10%, such as 1% to 4%.

According to the present invention, the polyamine-dialdehyde adduct may function as an additive. In such instances, the stoichiometric ratio of aldehyde functional groups of the dialdehyde compound to primary and/or secondary amino functional groups from polyamine may be at least 2:10, such as at least 3:10, such as at least 5:10, such as at least 7:10, and may be no more than 1:1, such as no more than 9:10, such as no more than 8:10, such as no more than 7:10, such as no more than 3:10. In instances where the polyamine-dialdehyde adduct functions as an additive, the stoichiometric ratio of aldehyde functional groups from the dialdehyde compound to primary and/or secondary amino functional groups from the polyamine may be 2:10 to 1:1, such as 3:10 to 9:10, such as 5:10 to 8:10, such as 5:10 to 7:10. As the stoichiometric ratio of aldehyde functional groups to amino functional groups increases, the molecular weight of the resulting polyamine-dialdehyde adduct correspondingly increases assuming a constant number of amino groups per polyamine molecule.

According to the present invention, the crater control additive also may comprise an epoxy microgel or an acrylic microgel.

Electrodeposition baths are typically supplied as two components: (i) a resin blend and (ii) a pigment paste. The resin blend may comprise (a) a main film-forming polymer (i.e., a main vehicle) (e.g., an active hydrogen-containing cationic salt group-containing resin) having reactive functional groups, (b) a curing agent that is reactive with functional groups on the film-forming polymer, (c) polybutylene oxide polymer, and (d) any additional water-dispersible non-pigmented components.

Also according to the present invention, the process for preparing the electrodepositable coating composition may comprise mixing: (a) an ionic film-forming polymer having functional groups; (b) a curing agent that is reactive with functional groups on the film-forming polymer; and (c) the polybutylene oxide polymer described herein.

According to the present invention, the ionic film-forming polymer having functional groups may comprise amine and/or hydroxyl functional groups. For clarity, the ionic film-forming polymer also may comprise additional functional groups in addition to the amine and/or hydroxyl functional group(s). The ionic film-forming polymer may also be referred to as a main film-forming polymer.

Wide varieties of main film-forming polymers are known and can be used in the electrodeposition baths of the invention so long as the polymers are "water dispersible." As used herein, "water dispersible" will mean that a material is adapted to be solubilized, dispersed, and/or emulsified in water. The main film-forming polymers used in the invention are cationic in nature. In other words, the main film-forming polymer comprises cationic salt groups, generally prepared by neutralizing a functional group on the film-forming polymer with an acid, which enables the main film-forming polymer to be electrodeposited onto a cathode.

Examples of main film-forming polymers suitable for use in cationic electrocoating coating compositions include, without limitation, cationic polymers derived from a polyepoxide, an acrylic, a polyurethane, and/or polyester, hydroxyl group-containing polymers, amine salt group-containing polymers, or combinations thereof. According to the present invention, the main film-forming polymer may be a copolymer of the polymers listed in the preceding sentence.

According to the present invention, the main film-forming polymer may be a cationic polymer (cationic resin) that is derived from a polyepoxide. For example, the main film-forming polymer can be prepared by reacting together a polyepoxide and a polyhydroxyl group-containing material selected from alcoholic hydroxyl group-containing materials and phenolic hydroxyl group-containing materials to chain extend or build the molecular weight of the polyepoxide. As will be discussed in greater detail below, the reaction product can then be reacted with a cationic salt group former to produce the cationic polymer.

According to the present invention, a chain extended polyepoxide typically is prepared as follows: the polyepoxide and polyhydroxyl group-containing material are reacted together "neat" or in the presence of an inert organic solvent such as a ketone, including methyl isobutyl ketone and methyl amyl ketone, aromatics such as toluene and xylene, and glycol ethers such as the dimethyl ether of diethylene glycol. The reaction typically is conducted at a temperature of 80° C. to 160° C. for 30 to 180 minutes until an epoxy group-containing resinous reaction product is obtained.

According to the present invention, the equivalent ratio of reactants (i.e., epoxy:polyhydroxyl group-containing material) may range from 1.00:0.50 to 1.00:2.00.

According to the present invention, the polyepoxide typically has at least two 1,2-epoxy groups. The epoxy compounds may be saturated or unsaturated, cyclic or acyclic, aliphatic, alicyclic, aromatic or heterocyclic. Moreover, the epoxy compounds may contain substituents such as halogen, hydroxyl, and ether groups.

Examples of polyepoxides are those having a 1,2-epoxy equivalency greater than one and/or two; that is, polyepoxides which have on average two epoxide groups per molecule. Suitable polyepoxides include polyglycidyl ethers of polyhydric alcohols such as cyclic polyols and polyglycidyl ethers of polyhydric phenols such as Bisphenol A. These polyepoxides can be produced by etherification of polyhydric phenols with an epihalohydrin or dihalohydrin such as epichlorohydrin or dichlorohydrin in the presence of alkali. Besides polyhydric phenols, other cyclic polyols can be used in preparing the polyglycidyl ethers of cyclic polyols. Examples of other cyclic polyols include alicyclic polyols, particularly cycloaliphatic polyols such as hydrogenated bisphenol A, 1,2-cyclohexane diol and 1,2-bis(hydroxymethyl)cyclohexane.

According to the present invention, the polyepoxides may have epoxide equivalent weights ≥180. According to the present invention, the polyepoxides may have epoxide equivalent weights ≤2000. According to the present invention, the polyepoxides may have epoxide equivalent weights that range between any combination of values, which were recited in the preceding sentences, inclusive of the recited values. For example, the polyepoxides may have epoxide equivalent weights ranges from 186 to 1200.

Epoxy group-containing acrylic polymers may also be used in the present invention. According to the present invention, epoxy group-containing acrylic polymers may have an epoxy equivalent weight ≥750, such as an epoxy equivalent weight of ≤2000. According to the present invention, the epoxy group-containing acrylic polymer has an epoxy equivalent weight that ranges between any combination of values, which were recited in the preceding sentences, inclusive of the recited values.

Examples of polyhydroxyl group-containing materials used to chain extend or increase the molecular weight of the polyepoxide (i.e., through hydroxyl-epoxy reaction) include alcoholic hydroxyl group-containing materials and phenolic hydroxyl group-containing materials. Examples of alcoholic hydroxyl group-containing materials are simple polyols such as neopentyl glycol; polyester polyols such as those described in U.S. Pat. No. 4,148,772; polyether polyols such as those described in U.S. Pat. No. 4,468,307; and urethane diols such as those described in U.S. Pat. No. 4,931,157. Examples of phenolic hydroxyl group-containing materials are polyhydric phenols such as Bisphenol A, phloroglucinol, catechol, and resorcinol. Mixtures of alcoholic hydroxyl group-containing materials and phenolic hydroxyl group-containing materials may also be used.

The main film-forming polymer can contain cationic salt groups, which can be incorporated into the resin molecule as follows: The resinous reaction product prepared as described above is further reacted with a cationic salt group former. By "cationic salt group former" is meant a material which is reactive with epoxy groups and which can be acidified before, during, or after reaction with the epoxy groups to form cationic salt groups. Examples of suitable materials include amines such as primary or secondary amines which can be acidified after reaction with the epoxy groups to form amine salt groups, or tertiary amines which can be acidified prior to reaction with the epoxy groups and which after reaction with the epoxy groups form quaternary ammonium salt groups. Examples of other cationic salt group formers are sulfides which can be mixed with acid prior to reaction with the epoxy groups and form ternary sulfonium salt groups upon subsequent reaction with the epoxy groups.

When amines are used as the cationic salt formers, monoamines, hydroxyl-containing amines, polyamines, or combinations thereof may be used.

Tertiary and secondary amines are used more often than primary amines because primary amines are polyfunctional with respect to epoxy groups and have a greater tendency to gel the reaction mixture. If polyamines or primary amines are used, they can be used in a substantial stoichiometric excess to the epoxy functionality in the polyepoxide so as to prevent gelation and the excess amine can be removed from the reaction mixture by vacuum stripping or other technique at the end of the reaction. The epoxy may be added to the amine to ensure excess amine.

Examples of hydroxyl-containing amines include, but are not limited to, alkanolamines, dialkanolamines, alkyl alkanolamines, and aralkyl alkanolamines containing from 1 to 18 carbon atoms, such as 1 to 6 carbon atoms, in each of the alkanol, alkyl and aryl groups. Specific examples include ethanolamine, N-methylethanolamine, diethanolamine, N-phenylethanolamine, N,N-dimethylethanolamine, N-methyldiethanolamine, 3-aminopropyldiethanolamine, and N-(2-hydroxyethyl)-piperazine.

Amines such as mono, di, and trialkylamines and mixed aryl-alkyl amines which do not contain hydroxyl groups or amines substituted with groups other than hydroxyl which do not negatively affect the reaction between the amine and the epoxy may also be used. Specific examples include ethylamine, methylethylamine, triethylamine, N-benzyldimethylamine, dicocoamine, 3-dimethylaminopropylamine, and N,N-dimethylcyclohexylamine.

Mixtures of the above-mentioned amines may also be used in the present invention.

The reaction of a primary and/or secondary amine with the polyepoxide takes place upon mixing of the amine and polyepoxide. The amine may be added to the polyepoxide or vice versa. The reaction can be conducted neat or in the presence of a suitable solvent such as methyl isobutyl ketone, xylene, or 1-methoxy-2-propanol. The reaction is generally exothermic and cooling may be desired. However, heating to a moderate temperature ranging from 50° C. to 150° C. may be done to hasten the reaction.

The reaction product of the primary and/or secondary amine and the polyepoxide is made cationic and water dispersible by at least partial neutralization with an acid. Suitable acids include organic and inorganic acids. Non-limiting examples of suitable organic acids include formic acid, acetic acid, methanesulfonic acid, and lactic acid. Non-limiting examples of suitable inorganic acids include phosphoric acid and sulfamic acid. By "sulfamic acid" is meant sulfamic acid itself or derivatives thereof such as those having the formula:

wherein R is hydrogen or an alkyl group having 1 to 4 carbon atoms.

It is noted that mixtures of the above mentioned acids may also be used may be used in the present invention.

The extent of neutralization of the cationic electrodepositable coating composition varies with the particular reaction product involved. However, sufficient acid should be used to disperse the electrodepositable coating composition in water. Typically, the amount of acid used provides at least 20 percent of all of the total neutralization. Excess acid may also be used beyond the amount required for 100 percent total neutralization. For example, the amount of acid used to neutralize the electrodepositable coating composition may be ≥1% based on the total amines in the electrodepositable coating composition, and the amount of acid used to neutralize the electrodepositable coating composition may be ≤100% based on the total amines in the electrodepositable coating composition. According to the present invention, the total amount of acid used to neutralize the electrodepositable coating composition ranges between any combination of values, which were recited in the preceding sentences, inclusive of the recited values. For example, the total amount of acid used to neutralize the electrodepositable coating composition can be 20%, 35%, 50%, 60%, or 80% based on the total amines in the electrodepositable coating composition.

In the reaction of a tertiary amine with a polyepoxide, the tertiary amine can be pre-reacted with the neutralizing acid to form the amine salt and then the amine salt reacted with the polyepoxide to form a quaternary salt group-containing resin. The reaction is conducted by mixing the amine salt with the polyepoxide in water. Typically, the water is present in an amount ranging from 1.75% to 20% by weight based on total reaction mixture solids.

In forming the quaternary ammonium salt group-containing resin, the reaction temperature can be varied from the lowest temperature at which the reaction will proceed, generally room temperature or slightly thereabove, to a maximum temperature of 100° C. (at atmospheric pressure). At higher pressures, higher reaction temperatures may be used. The reaction temperature may range from 60° C. to 100° C. Solvents such as a sterically hindered ester, ether, or sterically hindered ketone may be used, but their use is not necessary.

In addition to the primary, secondary, and tertiary amines disclosed above, a portion of the amine that is reacted with the polyepoxide can be a ketimine of a polyamine, such as is described in U.S. Pat. No. 4,104,147, column 6, line 23 to column 7, line 23. The ketimine groups decompose upon dispersing the amine-epoxy resin reaction product in water. n, at least a portion of the active hydrogens present in the resin (a) comprise primary amine groups derived from the reaction of a ketimine-containing compound and an epoxy group-containing material such as those described above.

In addition to resins containing amine salts and quaternary ammonium salt groups, cationic polymers containing ternary sulfonium groups may be used in the composition of the present invention. Examples of these resins and their method of preparation are described in U.S. Pat. Nos. 3,793,278 and 3,959,106.

Suitable active hydrogen-containing, cationic salt group-containing resins can include copolymers of one or more alkyl esters of acrylic acid or (meth)acrylic acid optionally together with one or more other polymerizable ethylenically unsaturated monomers. Suitable alkyl esters of acrylic acid or (meth)acrylic acid include methyl (meth)acrylate, ethyl (meth)acrylate, butyl (meth)acrylate, ethyl acrylate, butyl acrylate, and 2-ethyl hexyl acrylate. Suitable other copolymerizable ethylenically unsaturated monomers include nitriles such acrylonitrile and (meth)acrylonitrile, vinyl and vinylidene halides such as vinyl chloride and vinylidene fluoride and vinyl esters such as vinyl acetate. Acid and anhydride functional ethylenically unsaturated monomers such as acrylic acid, (meth)acrylic acid or anhydride, itaconic acid, maleic acid or anhydride, or fumaric acid may be used. Amide functional monomers including acrylamide, (meth)acrylamide, and N-alkyl substituted (meth)acrylamides are also suitable. Vinyl aromatic compounds such as styrene and vinyl toluene can be used so long as a high level of photodegradation resistance of the polymer is not required.

Functional groups such as hydroxyl and amino groups can be incorporated into the acrylic polymer by using functional monomers such as hydroxyalkyl acrylates and methacrylates or aminoalkyl acrylates and methacrylates. Epoxide functional groups (for conversion to cationic salt groups) may be incorporated into the acrylic polymer by using functional monomers such as glycidyl acrylate and methacrylate, 3,4-epoxycyclohexylmethyl(meth)acrylate, 2-(3,4-epoxycyclohexyl)ethyl(meth)acrylate, or allyl glycidyl ether. Alternatively, epoxide functional groups may be incorporated into the acrylic polymer by reacting carboxyl groups on the acrylic polymer with an epihalohydrin or dihalohydrin such as epichlorohydrin or dichlorohydrin.

The acrylic polymer can be prepared by traditional free radical initiated polymerization techniques, such as solution or emulsion polymerization, as known in the art, using suitable catalysts which include organic peroxides and azo type compounds and optionally chain transfer agents such as alpha-methyl styrene dimer and tertiary dodecyl mercaptan. Additional acrylic polymers which are suitable for forming the active hydrogen-containing, cationic polymer and which can be used in the electrodepositable coating compositions of the present invention include those resins described in U.S. Pat. Nos. 3,455,806 and 3,928,157.

As stated above, the main film-forming polymer can also be derived from a polyurethane. Among the polyurethanes which can be used are polymeric polyols which are prepared by reacting polyester polyols or acrylic polyols such as those mentioned above with a polyisocyanate such that the OH/NCO equivalent ratio is greater than 1:1 so that free hydroxyl groups are present in the product. Smaller polyhydric alcohols such as those disclosed above for use in the preparation of the polyester may also be used in place of or in combination with the polymeric polyols.

Additional examples of polyurethane polymers suitable for forming the active hydrogen-containing, cationic polymer include the polyurethane, polyurea, and poly(urethane-urea) polymers prepared by reacting polyether polyols and/or polyether polyamines with polyisocyanates. Such polyurethane polymers are described in U.S. Pat. No. 6,248,225.

Epoxide functional groups may be incorporated into the polyurethane by methods well known in the art. For example, epoxide groups can be incorporated by reacting glycidol with free isocyanate groups.

Sulfonium group-containing polyurethanes can also be made by at least partial reaction of hydroxy-functional sulfide compounds, such as thiodiglycol and thiodipropanol, which results in incorporation of sulfur into the backbone of the polymer. The sulfur-containing polymer is then reacted with a monofunctional epoxy compound in the presence of acid to form the sulfonium group. Appropriate monofunctional epoxy compounds include ethylene oxide, propylene oxide, glycidol, phenylglycidyl ether, and CARDURA E, available from Resolution Performance Products.

In addition to being derived from a polyepoxide or a polyurethane, the main film-forming polymer can also be derived from a polyester. Such polyesters can be prepared in a known manner by condensation of polyhydric alcohols and polycarboxylic acids. Suitable polyhydric alcohols include, for example, ethylene glycol, propylene glycol, butylene glycol, 1,6-hexylene glycol, neopentyl glycol, diethylene glycol, glycerol, trimethylol propane, and pentaerythritol. Examples of suitable polycarboxylic acids used to prepare the polyester include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl esters of the acids such as the methyl esters may be used. Moreover, hydroxy acids and/or lactones, such as caprolactone and/or 12-hydroxystearic acid, may also be used as components of the polyester.

The polyesters contain a portion of free hydroxyl groups (resulting from the use of excess polyhydric alcohol and/or higher polyols during preparation of the polyester) which are available for cure reactions.

Epoxide functional groups may be incorporated into the polyester by reacting carboxyl groups on the polyester with an epihalohydrin or dihalohydrin such as epichlorohydrin or dichlorohydrin. Alternatively, an acid functional polyester may be incorporated into an epoxy polymer by reaction of carboxyl groups with an excess of polyepoxide.

Sulfonium salt groups can be introduced by the reaction of an epoxy group-containing polymer of the types described above with a sulfide in the presence of an acid, as described in U.S. Pat. Nos. 3,959,106 and 4,715,898. Sulfonium groups can be introduced onto the polyester backbones described using similar reaction conditions.

According to the present invention, the main film-forming polymer further comprises cationic amine salt groups which are derived from pendant and/or terminal amino groups. By "terminal and/or pendant" is meant that primary and/or secondary amino groups are present as a substituent which is pendant from or in the terminal position of the polymeric backbone, or, alternatively, is an end-group substituent of a group which is pendant and/or terminal from the polymer backbone. In other words, the amino groups from which the cationic amine salt groups are derived are not required to be within the polymeric backbone. The pendant and/or terminal amino groups can have the following structures (I) or (II):

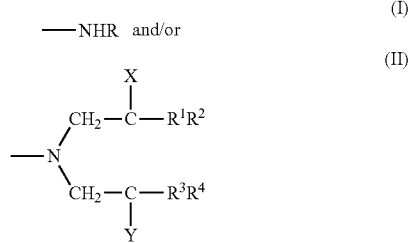

wherein R represents H or $C_1$ to $C_{18}$ alkyl; $R^1$, $R^2$, $R^3$, and $R^4$ are the same or different, and each independently represents H or $C_1$ to $C_4$ alkyl; and X and Y can be the same or different, and each independently represents a hydroxyl group and/or an amino group.

As used in conjunction with structures (I) and (II), "alkyl" is meant alkyl and aralkyl, cyclic or acyclic, linear or branched monovalent hydrocarbon groups. The alkyl groups can be unsubstituted or substituted with one or more heteroaoms, for example, non-carbon, non-hydrogen atoms such as one or more oxygen, nitrogen or sulfur atoms.

The pendant and/or terminal amino groups represented by structures (I) and (II) above can be derived from a compound selected from the group consisting of ammonia, methylamine, diethanolamine, diisopropanolamine, N-hydroxyethyl ethylenediamine, diethylenetriamine, and mixtures thereof. One or more of these compounds is reacted with one or more of the above described polymers, for example, a polyepoxide polymer, where the epoxy groups are ring-opened via reaction with a polyamine, thereby providing terminal amino groups and secondary hydroxyl groups.

According to the present invention, the terminal amino groups have structure (II) wherein both X and Y comprise primary amino groups (e.g., the amino group is derived from diethylenetriamine). It should be understood that in this instance, prior to reaction with the polymer, the primary amino groups can be blocked, for example, by reaction with a ketone such as methyl isobutyl ketone, to form the diketimine. Such ketimines are those described in U.S. Pat. No. 4,104,147, column 6, line 23 to column 7, line 23. The ketimine groups can decompose upon dispersing the amine-epoxy reaction product in water, thereby providing free primary amine groups as curing reaction sites.

According to the present invention, the amines from which the pendant and/or terminal amino groups are derived comprise primary and/or secondary amine groups such that the active hydrogens of said amines will be consumed by reaction with the at least partially blocked aliphatic polyisocyanate curing agent to form urea groups or linkages during the curing reaction.

It should be understood that the active hydrogens associated with the main film-forming polymer may include any active hydrogens which are reactive with isocyanates at temperatures sufficient to cure the electrodepositable coating composition as previously discussed (i.e., at temperatures at or below 182.2° C. (360° F.)). The active hydrogens may comprise hydroxyl groups, and primary and secondary amino, including mixed groups such as hydroxyl and primary amino. According to the present invention, at least a portion of the active hydrogens may be derived from hydroxyl groups comprising phenolic hydroxyl groups. According to the present invention, the main film-forming polymer has an active hydrogen content of ≥1 milliequivalents of active hydrogen per gram of resin blend solids, such as an active hydrogen content of ≤4 milliequivalents of active hydrogen per gram of resin blend solids. According to the present invention, the main film-forming polymer may have an active hydrogen content ranging between any combination of values, which were recited in the preceding sentences, inclusive of the recited values. For example, the main film-forming polymer may have an active hydrogen content ranging from 2 to 3 milliequivalents of active hydrogen per gram of resin blend solids.

The extent of cationic salt group formation should be such that when the resin is mixed with an aqueous medium and other ingredients, a stable dispersion of the electrodepositable coating composition will form. By "stable dispersion" is meant one that does not settle or is easily redispersible if some settling occurs. Moreover, the dispersion should be of sufficient cationic character that the dispersed resin particles will electrodeposit on a cathode when an electrical potential is set up between an anode and a cathode immersed in the aqueous dispersion.

According to the present invention, the main film-forming polymer in the electrodepositable coating composition of the present invention may comprise ≥0.1 milliequivalents of cationic salt group per gram of resin blend solids, and the main film-forming polymer may comprise ≤3.0 milliequivalents of cationic salt group per gram of resin blend solids. According to the present invention, the milliequivalents of cationic salt group per gram of resin blend solids in the main film-forming polymer may range between any combination of values, which were recited in the preceding sentences, inclusive of the recited values. For example, the electrodepositable coating composition may comprise from 0.1 to 0.7 milliequivalents of cationic salt group per gram of resin blend solids.

Moreover, the main film-forming polymer typically is non-gelled, having a number average molecular weight ≥2000. According to the present invention, the main film-forming polymer is non-gelled and has a number average molecular weight of ≤15,000. According to the present invention, the average molecular weight of the main film-forming polymer may range between any combination of values, which were recited in the preceding sentences, inclusive of the recited values. For example, the average molecular weight of the main film-forming polymer may range from 5,000 to 10,000. As used herein, "non-gelled" means a polymer that is substantially free from crosslinking, and prior to cationic salt group formation, the resin has a measurable intrinsic viscosity when dissolved in a suitable solvent. In contrast, a gelled resin, having an essentially infinite molecular weight, would have an intrinsic viscosity too high to measure.

According to the present invention, the main film-forming polymer may be present in the electrodepositable coating composition in an amount of ≥40% by weight based on the weight of total resin blend solids present in the electrodepositable coating composition. According to the present invention, the main film-forming polymer may be present in the electrodepositable coating composition in an amount of ≤95% by weight based on the weight of total resin blend solids present in the electrodepositable coating composition. According to the present invention, the weight percent of the main film-forming polymer in the electrodepositable coating composition may range between any combination of values that were recited in the preceding sentences, inclusive of the recited values. For example, the main film-forming polymer may be present in the electrodepositable coating composition in an amount ranging from 50% to 75% by weight based on the weight of total resin blend solids present in the electrodepositable coating composition.

According to the present invention, the main film-forming polymers may be selected from cationic acrylic polymers such as those described in U.S. Pat. Nos. 3,455,806 and 3,928,157. According to the present invention, the main film-forming polymer may be selected from the polymers described in U.S. Pat. Nos. 6,165,338 and 4,543,376, which are incorporated herein by reference. According to the present invention, the main film-forming polymers may be selected from hydroxy group-containing polymers including, without limitation, the reaction products of: (i) bisphenol A and ethylene oxide, (ii) bisphenol A and propylene oxide, (iii) bisphenol A and polyethylene oxide and/or polypropylene oxide diamines, and/or (iv) bisphenol A and bisphenol A diglycidal either. According to the present invention, the main film-forming polymers may be amine salt group-containing polymers including, without limitation, the acid-solubilized reaction products of polyepoxides and primary or secondary amines such as those described in U.S. Pat. Nos. 3,663,389; 3,984,299; 3,947,338; 3,947,339; and 4,116,900. Suitable primary or secondary amines include, without limitation, methyl ethanol amine, diethanolamine, diethylene triamine diketimine, diethyl amine, dimethyl amine, other di alkyl amines, amino propyl diethanols amine, or combinations thereof. Usually, these amine salt group-containing polymers are used in combination with a blocked isocyanate curing agent. The isocyanate can be fully blocked as described in the aforementioned U.S. Pat. No. 3,984,299 or the isocyanate can be partially blocked and reacted with the polymer backbone such as described in U.S. Pat. No. 3,947,338. Also, one-component compositions as described in U.S. Pat. No. 4,134,866 and DE-OS No. 2,707,405 can be used as the main film-forming resin.

Besides amine salt group-containing polymers, quaternary ammonium salt group-containing polymers can also be employed. Examples of these polymers are those which are formed by reacting an organic polyepoxide with a tertiary amine salt. Such polymers are described in U.S. Pat. Nos. 3,962,165; 3,975,346; and 4,001,101. Examples of other cationic polymers are ternary sulfonium salt group-containing polymers and quaternary phosphonium salt-group containing polymers such as those described in U.S. Pat. Nos. 3,793,278 and 3,984,922, respectively. Also, film-forming polymers which cure via transesterification such as described in European Application No. 12463 can be used. Further, cationic compositions prepared from Mannich bases such as described in U.S. Pat. No. 4,134,932 can be used.

As stated above, in addition to the (a) main film-forming polymer, the resin blend further comprises (b) a curing agent (crosslinker) that is reactive with reactive functional groups, such as active hydrogen groups, on the main film-forming polymer. The curing agents that may be used with the present invention include, but is not limited to, urethane, isocyanate, ester, or combinations thereof.

It will be understood that non-limiting examples of urethane curing agents include the products of (i) an amine-carbonate reaction and/or (ii) an isocyanate-alcohol reaction.

Non-limiting examples of suitable cyclic carbonates that may be utilized to form the urethane curing agent include, without limitation, propylene carbonate, ethylene carbonate, butylene carbonate, or combinations thereof. Non-limiting examples of suitable acyclic carbonates that may be utilized to form the urethane, include, without limitation, dimethyl carbonate, diethyl carbonate, methylethyl carbonate, dipropyl carbonate, methylpropyl carbonate, dibutyl carbonate, or combinations thereof. According to the present invention, the acyclic carbonate may comprise dimethyl carbonate. Non-limiting examples of suitable amines that may be utilized to form the urethane, include, without limitation, diethylene triamine, dipropylene triamine, bis-hexamethylene triamine, isophorone diamine, 4'-bis-aminocyclohexylamine, xylylene diamine, N-hydroxyethyl ethylene diamine, hexamethylene triamine, trisaminoethylamine, or combinations thereof. According to the present invention, the curing agent may be a reaction product of a polyamine and a cyclic carbonate, and the primary amines of the polyamine may be reacted with the cyclic carbonate. According to the present invention, the reaction product of the polyamine and the cyclic carbonate may then be reacted with an epoxy functional polymer such as those used to prepare the main vehicle and/or grind vehicle. Specifically, the secondary amine of the reaction product may be reacted with the epoxy functional group of the epoxy functional polymer.

Non-limiting examples of suitable isocyanates that can be utilized to form the urethane curing agent include, without limitation, toluene diisocyanate, methylene diphenyl 4,4'- diisocyanate, isophorone diisocyanate, hexamethylene diisocyanate, xylyleuediisocyanate, tetramethylxylylene diisocyanate, straight chain aliphatic diisocyanates such as 1,4-tetramethylene diisocyanate, norbornane diisocyanate, and 1,6-hexamethylene diisocyanate, isophorone diisocyanate and 4,4'-methylene-bis-(cyclohexyl isocyanate), aromatic diisocyanates such as p-phenylene diisocyanate, diphenylmethane-4,4'-diisocyanate and 2,4- or 2,6-toluene diisocyanate, higher polyisocyanates such as triphenylmethane-4,4', 4"-triisocyanate, 1,2,4-benzene triisocyanate and polymethylene polyphenyl isocyanate, and trimers of 1,6-hexamethylene diisocyanate, or combinations thereof. It should be noted that the dimers, trimers and higher functional materials of these isocyanates may also be utilized in the present invention. Non-limiting examples of suitable alcohols that can be utilized to form the urethane include, without limitation, methanol, ethanol, propanol, isopropanol, butanol, glycol ethers, and other alcohols.

As stated above, suitable curing agents for amine salt group-containing polymers, cationic acrylic polymers, and/or hydroxy group-containing polymers include isocyanates as well as blocked isocyanates. It should be noted that as used herein, "isocyanates" also includes polyisocyanates and vice versa. The polyisocyanate curing agent may be a fully blocked polyisocyanate with substantially no free isocyanate groups, or it may be partially blocked and reacted with the resin backbone as described in U.S. Pat. No. 3,984,299. The polyisocyanate can be an aliphatic, an aromatic polyisocyanate, or combinations thereof. According to the present invention, diisocyanates may be utilized, although in other higher polyisocyanates may be used in place of or in combination with diisocyanates.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) may also be used. A mixture of diphenylmethane-4,4'-diisocyanate and polymethylene polyphenyl isocyanate may be used.

Any suitable alcohol or polyol can be used as a blocking agent for the polyisocyanate in the electrodepositable coating composition of the present invention provided that the agent will deblock at the curing temperature and provided a gelled product is not formed. For example, suitable alcohols include, without limitation, methanol, ethanol, propanol, isopropyl alcohol, butanol, 2-ethylhexanol, butoxyethanol, hexyloxyethanol, 2-ethylhexyloxyethanol, n-butanol, cyclohexanol phenyl carbinol, methylphenyl carbinol, ethylene glycol monobutyl ether, diethylene glycol monobutylether, ethylene glycol monomethylether, propylene glycol monomethylether, or combinations thereof.

According to the present invention, the blocking agent comprises one or more 1,3-glycols and/or 1,2-glycols. According to the present invention, the blocking agent may comprise one or more 1,2-glycols, typically one or more $C_3$ to $C_6$ 1,2-glycols. For example, the blocking agent may be selected from at least one of 1,2-propanediol, 1,3-butanediol, 1,2-butanediol, 1,2-pentanediol, timethylpentane diol, and/or 1,2-hexanediol.

Other suitable blocking agents include oximes such as methyl ethyl ketoxime, acetone oxime and cyclohexanone oxime and lactams such as epsilon-caprolactam.

Additionally, the hydroxyl-functional polybutylene oxide polymers contain hydroxyl-functional end groups, and therefore, may be used as a blocking agent either alone or in combination with other suitable blocking agents.

As stated above, the curing agent that is used in the present invention may be an ester curing agent. It should be noted that as used herein, "ester" also includes polyesters. Accordingly, the ester curing agent may be a polyester curing agent. Suitable polyester curing agents include materials having greater than one ester group per molecule. The ester groups are present in an amount sufficient to effect cross-linking, for example, at temperatures up to 250° C., and curing times of up to 90 minutes. It should be understood that acceptable cure temperatures and cure times will be dependent upon the substrates to be coated and their end uses.

Compounds generally suitable as the polyester curing agent may be polyesters of polycarboxylic acids. Non-limiting examples include bis(2-hydroxyalkyl)esters of dicarboxylic acids, such as bis(2-hydroxybutyl) azelate and bis(2-hydroxyethyl)terephthalate; tri(2-ethylhexanoyl)trimellitate; and poly(2-hydroxyalkyl)esters of acidic half-esters prepared from a dicarboxylic acid anhydride and an alcohol, including polyhydric alcohols. The latter type is suitable to provide a polyester with a final functionality of more than 2. One suitable example includes a polyester prepared by first reacting equivalent amounts of the dicarboxylic acid anhydride (e.g., succinic anhydride or phthalic anhydride) with a trihydric or tetrahydric alcohol, such as glycerol, trimethylolpropane or pentaerythritol, at temperatures below 150° C., and then reacting the acidic polyester with at least an equivalent amount of an epoxy alkane, such as 1,2-epoxy butane, ethylene oxide, or propylene oxide. The polyester curing agent (ii) may comprise an anhydride. Another suitable polyester comprises a lower 2-hydroxy-akylterminated poly-alkyleneglycol terephthalate.

According to the present invention, the polyester curing agent may comprise at least one ester group per molecule in which the carbon atom adjacent to the esterified hydroxyl has a free hydroxyl group.

Also suitable is the tetrafunctional polyester prepared from the half-ester intermediate prepared by reacting trimellitic anhydride and propylene glycol (molar ratio 2:1), then reacting the intermediate with 1,2-epoxy butane and the glycidyl ester of branched monocarboxylic acids.

According to the present invention, where the active hydrogen-containing resin comprises cationic salt groups, the polyester curing agent may be substantially free of acid. For purposes of the present invention, "substantially free of acid" means having less than 0.2 meq/g acid. For aqueous systems, for example for cathodic electrocoating, coating compositions, suitable polyester curing agents may include non-acidic polyesters prepared from a polycarboxylic acid anhydride, one or more glycols, alcohols, glycol monoethers, polyols, and/or monoepoxides.

Suitable polycarboxylic anhydrides may include dicarboxylic acid anhydrides, such as succinic anhydride, phthalic anhydride, tetrahydrophthalic anhydride, trimellitic anhydride, hexahydrophthalic anhydride, methylhexahydrophthalic anhydride, 3,3',4,4'-benzophenonetetracarboxylic dianhydride, and pyromellitic dianhydride. Mixtures of anhydrides may be used.

Suitable alcohols may include linear, cyclic or branched alcohols. The alcohols may be aliphatic, aromatic or araliphatic in nature. As used herein, the terms glycols and mono-epoxides are intended to include compounds containing not more than two alcohol groups per molecule which can be reacted with carboxylic acid or anhydride functions below the temperature of 150° C.

Suitable mono-epoxides may include glycidyl esters of branched monocarboxylic acids. Further, alkylene oxides, such as ethylene oxide or propylene oxide may be used. Suitable glycols can include, for example ethylene glycol and polyethylene glycols, propylene glycol and polypropylene glycols, and 1,6-hexanediol. Mixtures of glycols may be used.

Non-acidic polyesters may be prepared, for example, by reacting, in one or more steps, trimellitic anhydride (TMA) with glycidyl esters of branched monocarboxylic acids in a molar ratio of 1:1.5 to 1:3, if desired with the aid of an esterification catalyst such as stannous octoate or benzyl dimethyl amine, at temperatures of 50-150° C. Additionally, trimellitic anhydride may be reacted with 3 molar equivalents of a monoalcohol such as 2-ethylhexanol.

Alternatively, trimellitic anhydride (1 mol) may be reacted first with a glycol or a glycol monoalkyl ether, such as ethylene glycol monobutyl ether in a molar ratio of 1:0.5 to 1:1, after which the product is allowed to react with 2 moles of glycidyl esters of branched monocarboxylic acids. Furthermore, the polycarboxylic acid anhydride i.e., those containing two or three carboxyl functions per molecule) or a mixture of polycarboxylic acid anhydrides may be reacted simultaneously with a glycol, such as 1,6-hexane diol and/or glycol mono-ether and monoepoxide, after which the product can be reacted with mono-epoxides, if desired. For aqueous compositions these non-acid polyesters may also be modified with polyamines such as diethylene triamine to form amide polyesters. Such "amine-modified" polyesters may be incorporated in the linear or branched amine adducts described above to form self-curing amine adduct esters.

The non-acidic polyesters of the types described above typically are soluble in organic solvents, and typically may be mixed readily with the main film forming resin described above.

Polyesters suitable for use in an aqueous system or mixtures of such materials disperse in water typically in the presence of resins comprising cationic salt groups.

According to the present invention, the polyisocyanate curing agents may be utilized in conjunction with the cationic main film-forming polymers in amounts of ≥5% by weight based on the total weight of the resin blend solids of the electrodeposition bath. According to the present invention, the polyisocyanate curing agents may be utilized in conjunction with the cationic main film-forming polymers in amounts of ≤60% by weight based on the total weight of the resin blend solids of the electrodeposition bath. According to the present invention, the amount of main film-forming polymer can range between any combination of values, which were recited in the preceding sentences, inclusive of the recited values. For example, the polyisocyanate curing agents may be utilized in conjunction with the cationic main film-forming polymers in an amount ranting from 20% to 50% by weight based on the total weight of the resin blend solids of the electrodeposition bath.

According to the present invention, the curing agent that may be used in the electrocoating composition is the curing agent that is described in U.S. Pat. No. 5,902,473, which is incorporated herein by reference.

It is understood that one skilled in the art can determine an appropriate curing agent for a particular main film-forming polymer based on the functionality of the main film-forming polymer.

According to the present invention, at least a portion of the curing agent may be chemically bound to the main film-forming polymer. According to the present invention, the curing agent may not be chemically bound to the main film-forming polymer and is added as an additive to the electrodepositable coating composition.

The pigment paste may have one or more pigments, a water dispersible polymer, and, optionally, additives such as surfactants, wetting agents, catalysts, dispersing aids, or combinations thereof. It should be noted that the water dispersible polymer of the pigment paste can either be the same or different from the main film-forming polymer in the resin blend. The pigment composition used in the pigment paste may be of the conventional type comprising pigments of, for example, iron oxides, strontium chromate, carbon black, coal dust, titanium dioxide, talc, barium sulfate, as well as color pigments such as cadmium yellow, cadmium red, chromium yellow and the like. According to the present invention, the pigment composition may comprise effect pigments such as, but not limited to, electroconductive and/or photo chromic pigments. The pigment content of the dispersion is usually expressed as a pigment-to-resin ratio. In the practice of the invention, when pigment is employed, the pigment-to-resin ratio is usually within the range of about 0.02:1 to 1:1. The other additives mentioned above are usually in the dispersion in amounts of about 0.01% to 3% by weight based on the total weight of the resin blend solids.

The first and second components of the electrodeposition bath are dispersed together in an aqueous medium which comprises water and, usually, coalescing solvents to form the electrodeposition bath. Useful coalescing solvents that can be used in the electrodeposition bath include, but are not limited to, hydrocarbons, alcohols, esters, ethers and/or ketones. According to the present invention, the coalescing solvents include alcohols, polyols and ketones. Specific coalescing solvents include isopropanol, butanol, 2-ethylhexanol, isophorone, 2-methoxypentanone, ethylene and propylene glycol and the monoethyl, monobutyl and monohexyl ethers of ethylene glycol. According to the present invention, the amount of coalescing solvent used in the electrodeposition bath may be ≥0.01% by weight based on the total weight of the aqueous medium used to make the electrodeposition bath. According to the present invention, the amount of coalescing solvent used in the electrodeposition bath may be ≤25% by weight based on the total weight of the aqueous medium used to make the electrodeposition bath. According to the present invention, the amount of coalescing solvent used in the electrodeposition bath may range between any combination of values, which were recited in the preceding sentences, inclusive of the recited values. For example, the amount of coalescing solvent used in the electrodeposition bath may range from 0.05% to 5% by weight based on the total weight of the aqueous medium used to make the electrodeposition bath.

According to the present invention, the electrodepositable coating composition may be substantially free of tin. As used herein, an electrodepositable coating composition is substantially free of tin if tin is present in an amount of less than 0.1% by weight, based on the total weight of the resin solids. The electrodepositable coating composition may be essentially free of tin. As used herein, an electrodepositable coating composition may be essentially free of tin if tin is present in an amount of less than 0.01% by weight, based on the total weight of the resin solids. The electrodepositable coating composition may be completely free of tin. As used here, an electrodepositable coating composition is completely free of tin if tin is not present in the composition, i.e., 0.00% by weight, based on the total resin solids.

As stated above, the polybutylene oxide polymer may be in the form of an additive that is added to an electrodepositable coating composition. According to the present invention, the additive may be added "neat", that is, added directly into the electrodepositable coating composition without prior blending or reacting with the other components that comprise the electrodepositable coating composition. For example, the additive may be added "neat" into an electrodeposition bath and/or to components that are used to form the electrodeposition bath (e.g., resin blend and/or pigment paste). According to the present invention, the additive may be added to an aqueous medium prior to the aqueous medium being added to the electrodeposition bath. For instance, the additive may be added to an aqueous medium, which is added to the electrodeposition bath after the electrodeposition bath has been prepared (i.e., post added). According to the present invention, the additive may be added "neat" into the resin blend and/or into the pigment paste before the resin blend and/or the pigment paste is dispersed in an aqueous medium. In other words, the additive may be added to the resin blend and/or to the pigment paste prior to the formation of the electrodeposition bath.

The electrodepositable coating composition of the present invention may be applied onto a number of substrates. Accordingly, the present invention is further directed to a substrate that is coated, at least in part, with the electrodepositable coating composition described herein. It will be understood that the electrocoating coating composition can be applied onto a substrate as a monocoat or as a coating layer in a multi-layer coating composite. Non-limiting examples of a suitable substrate can include a metal, a metal alloy, and/or a substrate that has been metallized such as nickel plated plastic. For example, the metal or metal alloy may include aluminum and/or steel. According to the present invention, the steel may be cold rolled steel, electrogalvanized steel, and hot dipped galvanized steel. According to the present invention, at least a portion of the surface of the metallic surface onto which the coating is applied may be pretreated with phosphate, such as zinc phosphate. According to the present invention, the coated substrate may comprise a portion of a vehicle such as a vehicular body (e.g., without limitation, door, body panel, trunk deck lid, roof panel, hood, and/or roof) and/or a vehicular frame. As used herein, the term "vehicle" or variations thereof includes, but is not limited to, civilian, commercial, and military land vehicles such as cars and trucks.

Depending on the substrate, the electrodepositable coating composition may be applied (i.e., electrodeposited) onto a substrate using a voltage that can range from 1 volt to several thousand volts. According to the present invention, the voltage that is used ranges from 50 volts to 500 volts. Moreover, the current density may be between 0.5 ampere and 5 amperes per square foot. It will be understood, however, that the current density tends to decrease during electrodeposition which is an indication of the formation of an insulating film.

After the coating has been applied onto the substrate via electrodeposition, the coating may be at least partially cured by baking the substrate at an elevated temperature ranging from 90° C. to 260° C. for a time period ranging from 1 minute to 60 minutes. The coating thickness may be 5 µm to 60 µm, such as 10 µm to 30 µm.

The electrodepositable coating composition of the present invention may be utilized in an electrocoating layer that is part of a multi-layer coating composite comprising a substrate with various coating layers. The coating layers could include a pretreatment layer, such as a phosphate layer (e.g., zinc phosphate layer), an electrocoating layer which results from the electrodepositable coating composition of the present invention, and suitable top coat layers (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers are applied onto a substantially uncured underlying layer. For example, a clear coat layer may be applied onto at least a portion of a substantially uncured basecoat layer (wet-on-wet), and both layers may be simultaneously cured in a downstream process.

Moreover, the top coat layers may be applied directly onto the electrodepositable coating layer. In other words, the substrate lacks a primer layer. For example, a basecoat layer may be applied directly onto at least a portion of the electrodepositable coating layer.

It will also be understood that the top coat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers can be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

According to the present invention, the photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

According to the present invention, it has been surprisingly discovered that the presence of a sufficient amount of the polybutylene oxide polymer in an electrodepositable coating composition results in a reduction in the depth of craters formed in the cured coating during the curing of the electrodepositable coating composition compared to an electrodepositable coating composition that does not include the polybutylene oxide polymer.

Figure 1B:
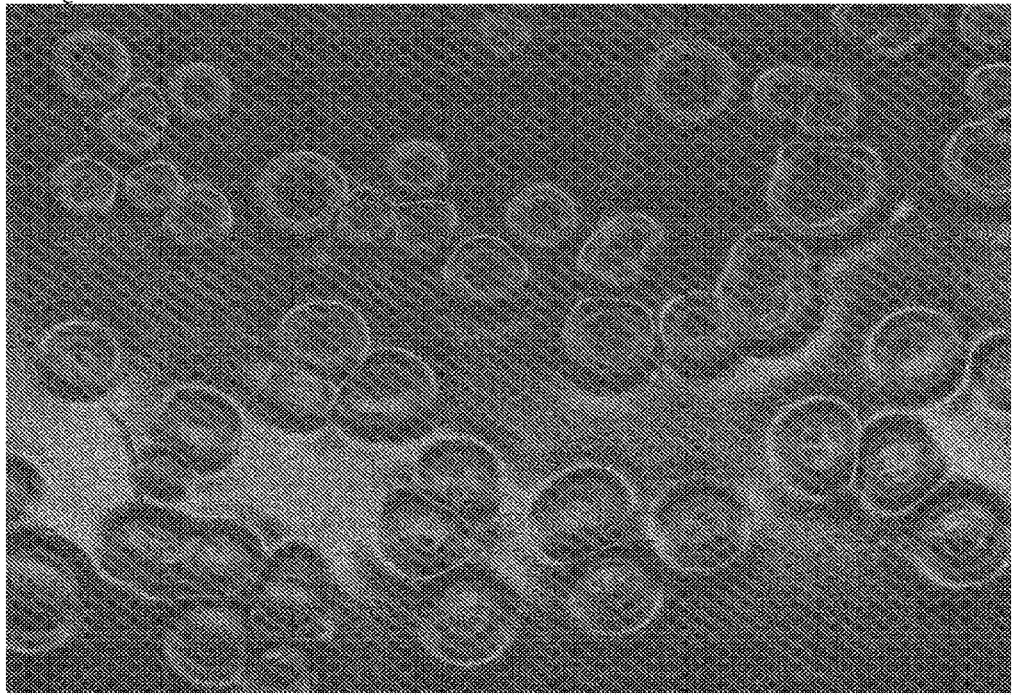
Figure 1C:
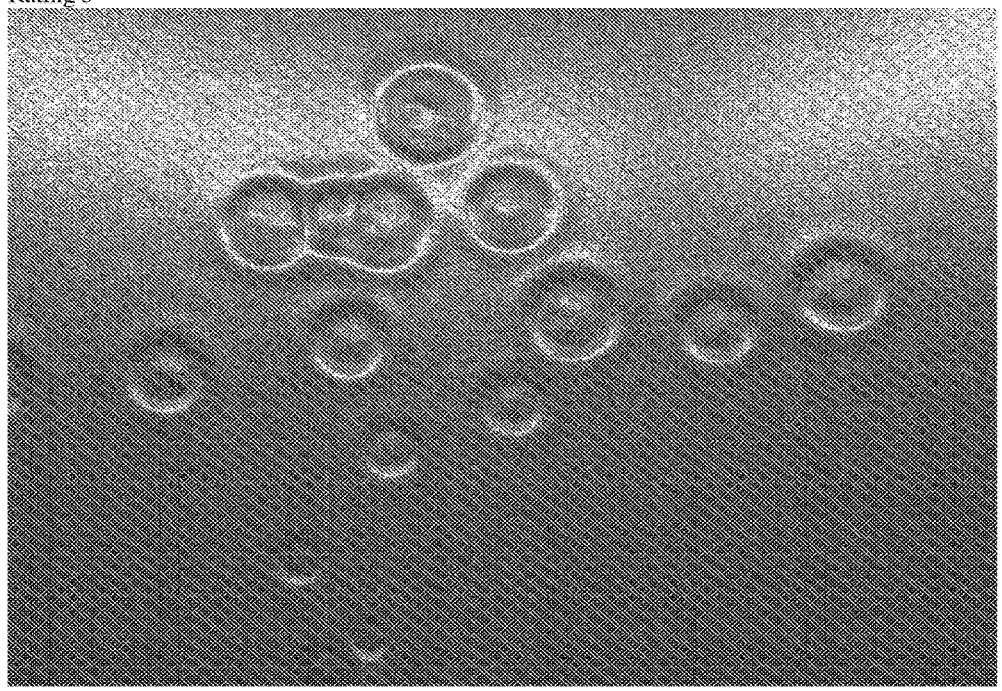
Figure 1D:
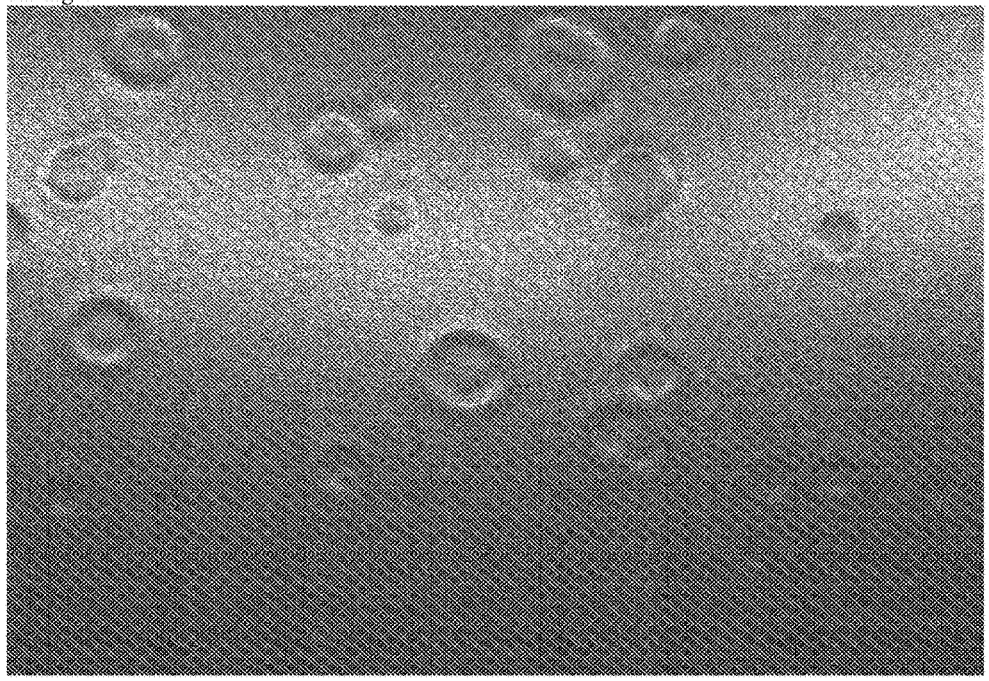
Figure 1E:
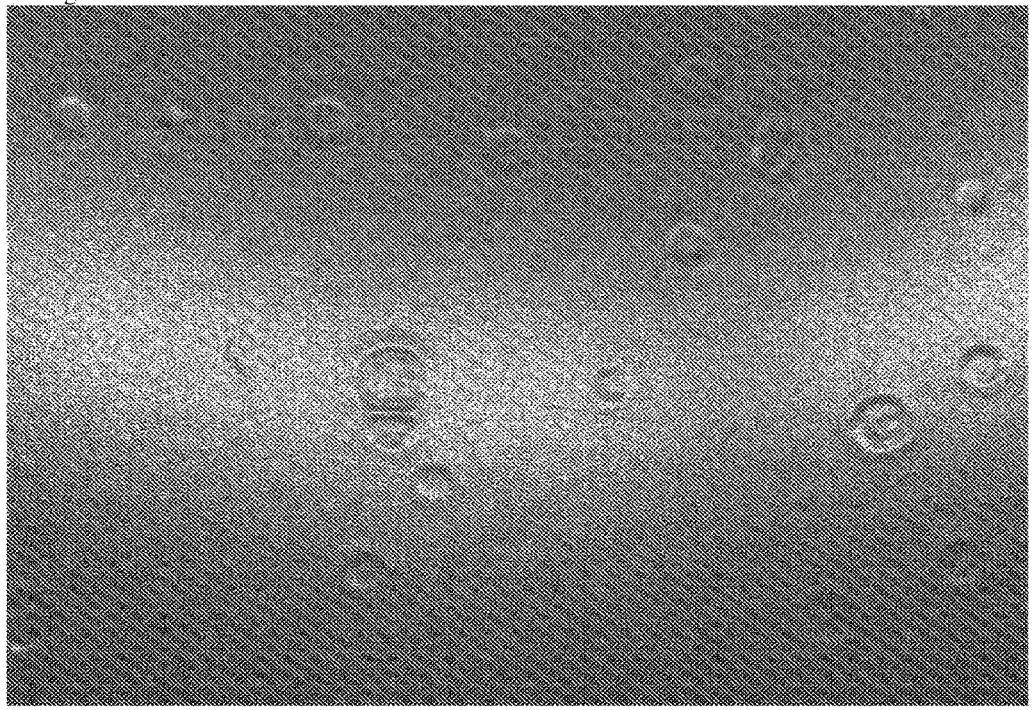
Figure 1F:
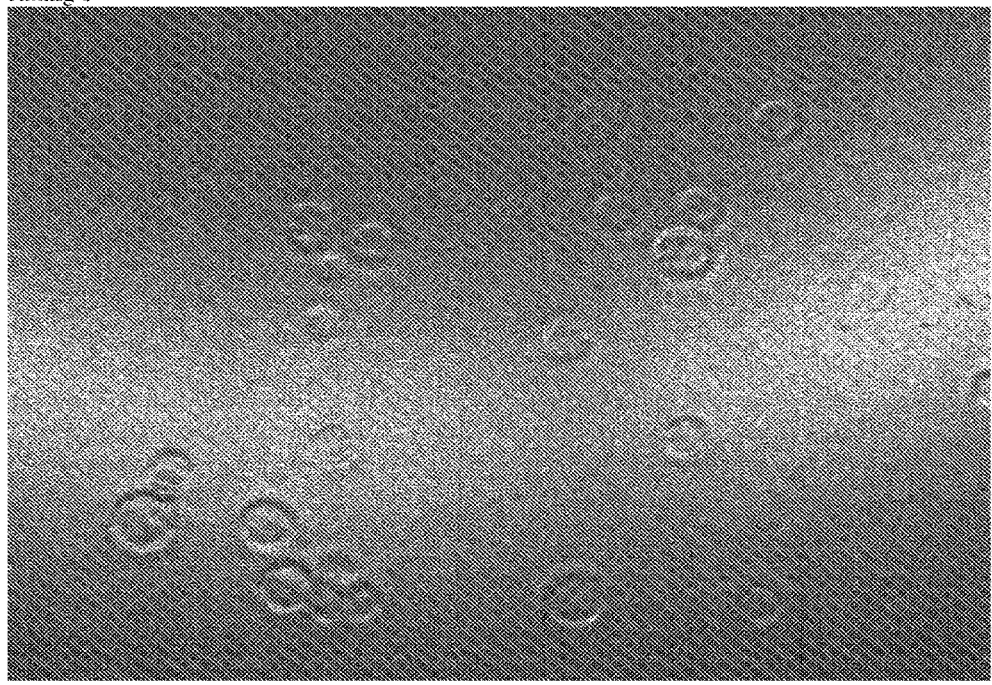
Figure 1G:
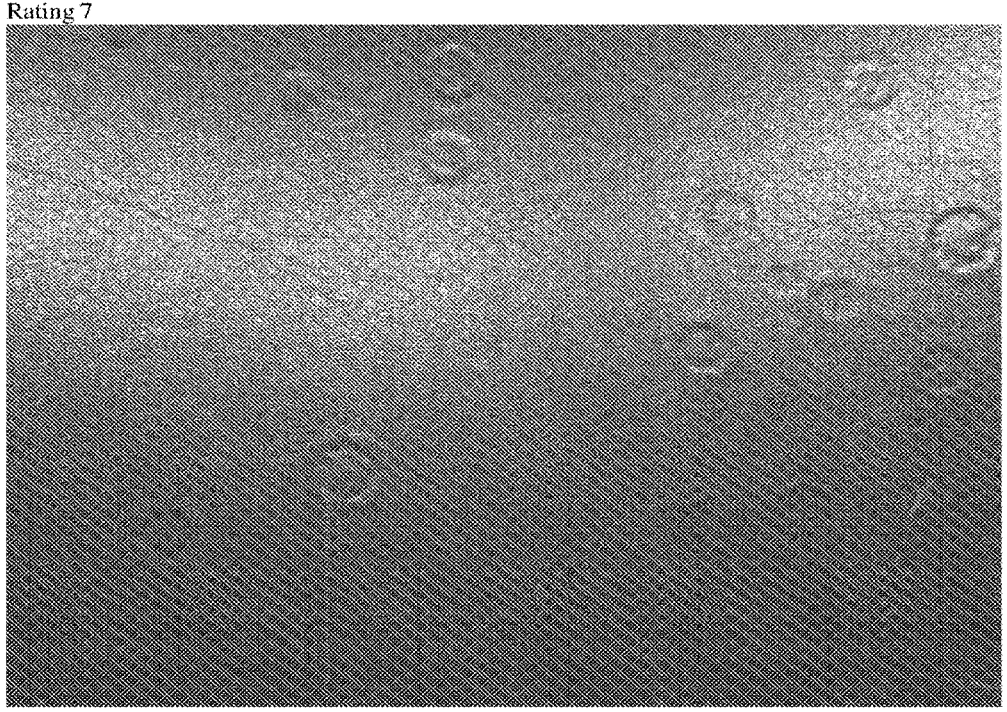
Figure 1H:
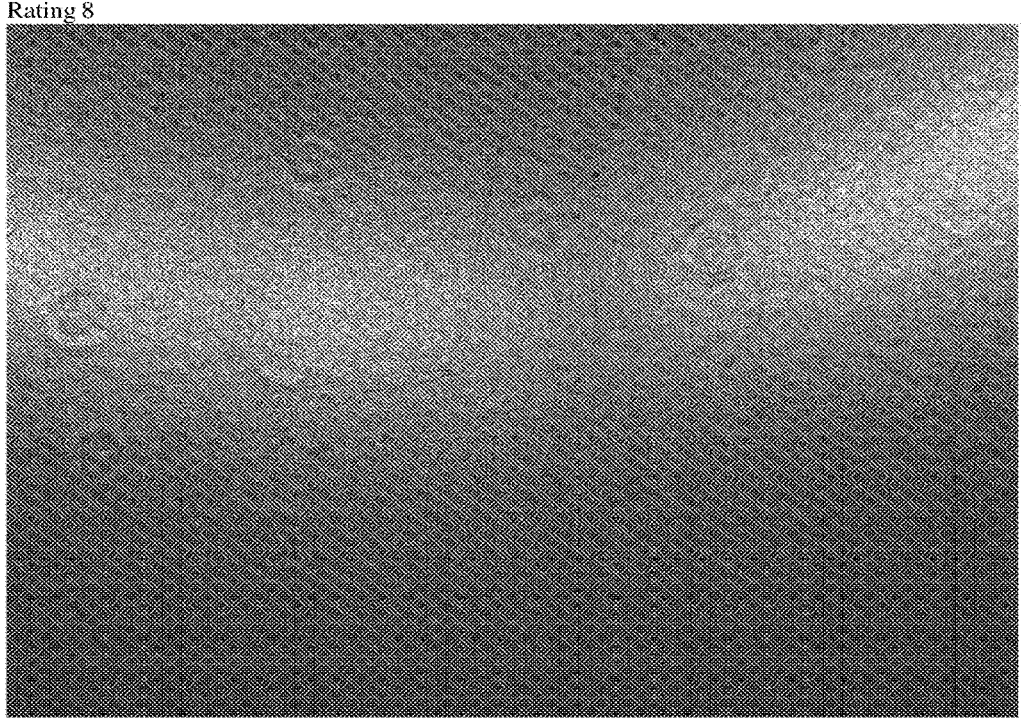
Figure 1I:
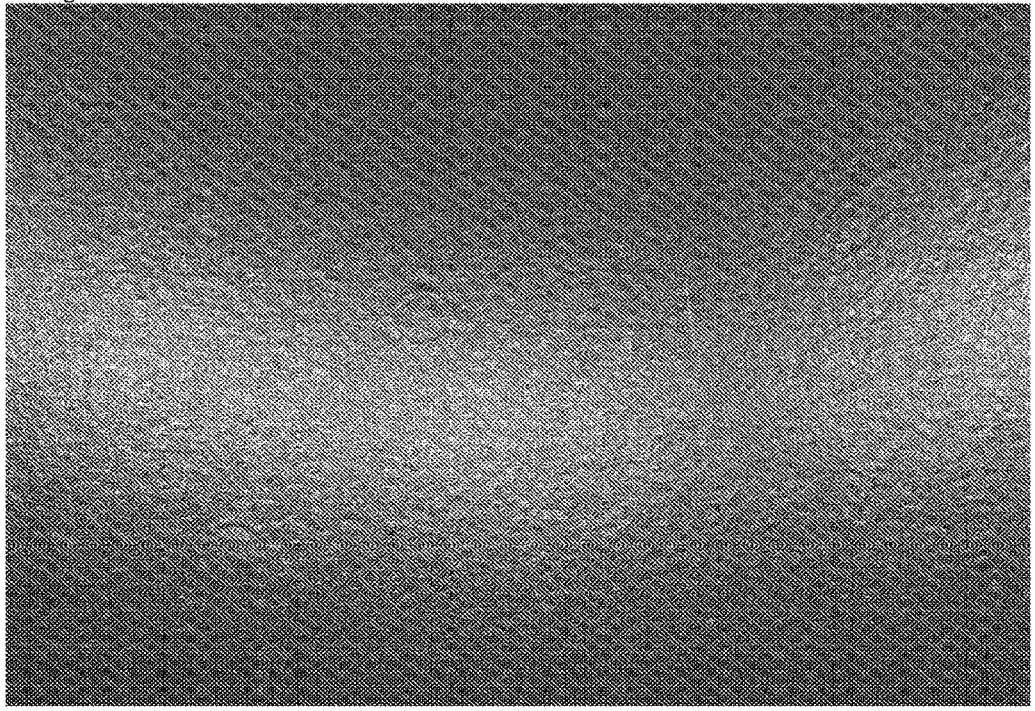
Figure 1J:
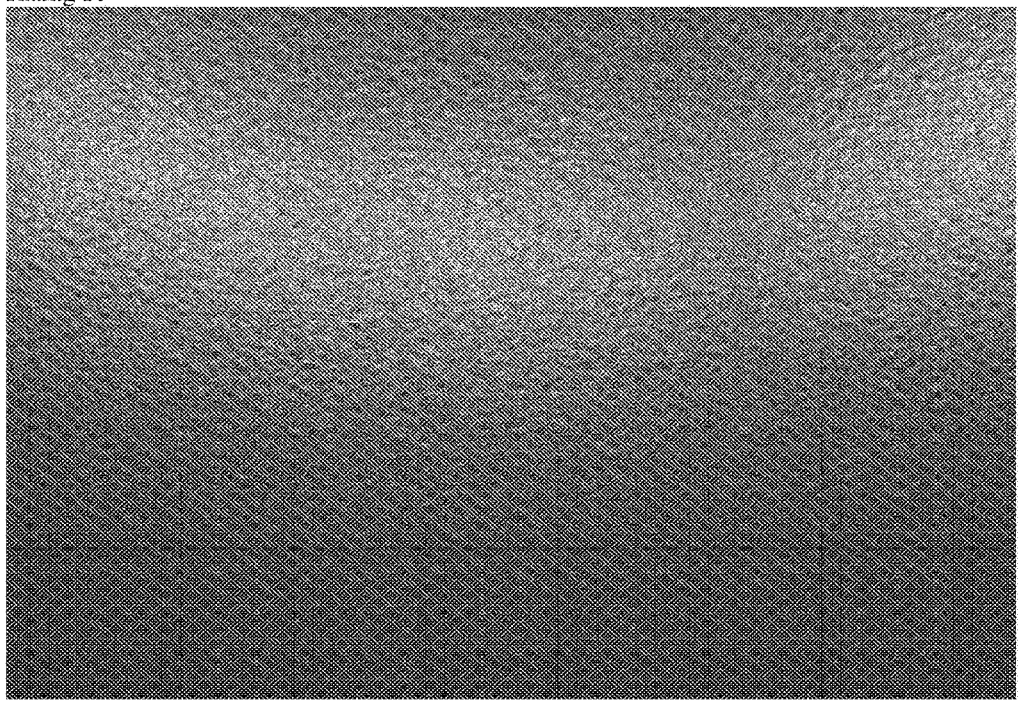

According to the present invention, the depth of craters formed in the cured coating may be qualitatively rated on a scale of 1 to 10 by visual inspection of the craters, with a rating of 1 representing significantly deep craters formed in the cured coating, a rating of 2-9 representing a decreasing depth of craters formed in the cured coating as the rating increases, and a rating of 10 having no craters formed in the cured coating. Included herein as FIG. 1 are ten photographs of panels that show the appearance of craters for each rating value of the scale and showing decreased crater depth as the rating increases. Accordingly, an increased crater rating indicates a decrease in the size of the craters formed. The inclusion of the polybutylene oxide polymer into an electrodepositable coating composition may result in a cured coating having a rating greater than the cured coating of an electrodepositable coating composition that did not include the polybutylene oxide polymer.

A quantitative measure of crater depth may be performed by any measurement method known in the art. For example, a quantitative measure of crater depth may be performed by scanning the coated panel using a Mitutoyo Surftest SJ-402 skidless stylus profilometer to examine the topography of crater defects in the cured coating layer. From the scanned profile of the crater, the highest point of the crater rim and lowest point of depth of each of the craters were measured on each side of the crater and the difference determined to determine crater depth. The measurement method is described in more detail in the Examples below. The presence of the polybutylene oxide polymer in the electrodepositable coating composition may reduce the crater depth of craters formed in the cured coating as measured by a Mitutoyo Surftest SJ-402 skidless stylus profilometer by at least 10%, such as at least 20%, such as at least 30%, such as at least 40%, such as at least 50%, such as at least 100% compared to a comparative coating composition that does not include the polybutylene oxide polymer. The presence of the polybutylene oxide polymer in the electrodepositable coating composition may reduce the crater depth as measured by a Mitutoyo Surftest SJ-402 skidless stylus profilometer to a crater depth of no more than 8 microns, such as no more than 6 microns, such as no more than 5 microns, such as no more than 4 microns.

Additionally, it has been surprisingly discovered that the presence of the polybutylene oxide polymer in an electrodepositable coating composition results in little to no negative impact on the adhesion of a subsequently applied coating layer. Coatings formed from the electrodepositable coating composition of the present invention may have an adhesion rating of at least 2, such as at least 4, such as at least 5, such as at least 7, as measured by the White Alkyd Adhesion Test described in the Examples below. The combination of reduced crater depth and good adhesion resulting from the use of the polybutylene oxide polymer was an unexpected result.

Furthermore, improvement in edge coverage may also result from inclusion of the polybutylene oxide polymer to an electrodepositable coating composition.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "a" polybutylene oxide polymer, "a" copolymer, and "an" ionic film-forming polymer, "a" curing agent, a combination (i.e., a plurality) of these components can be used. In addition, in this application, the use of "or" means "and/or" unless specifically stated otherwise, even though "and/or" may be explicitly used in certain instances.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

As employed herein, the term "polyol" or variations thereof refers broadly to a material having an average of two or more hydroxyl groups per molecule.

As used herein, the term "polymer" refers broadly to prepolymers, oligomers and both homopolymers and copolymers. It should be noted that the prefix "poly" refers to two or more.

As used herein, "adduct" means a product of a direct addition of two or more distinct molecules, resulting in a single reaction product containing all atoms of all components.

As used herein, the "resin blend solids" include the polybutylene oxide polymer, a curing agent, a resin used in preparation of the main film-forming polymer and/or pigment paste, and any additional water-dispersible non-pigmented component(s), such as, for example, the polyetheramine adduct, the polybutylene oxide polymer, and plasticizer.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

1. An electrodepositable coating composition comprising:
a polybutylene oxide polymer;
an ionic film-forming polymer having functional groups; and
a curing agent that is reactive with functional groups on the film-forming polymer.
2. The electrodepositable coating composition of Aspect 1, wherein the polybutylene oxide polymer comprises a copolymer of butylene oxide and propylene oxide.
3. The electrodepositable coating composition of Aspect 2, wherein the molar ratio of butylene oxide to propylene oxide of the copolymer is at least 1:1.

4. The electrodepositable coating composition of any of the preceding Aspects, wherein the polybutylene oxide polymer comprises at least two hydroxyl functional groups.
5. The electrodepositable coating composition of any of the preceding Aspects, wherein the polybutylene oxide polymer has a hydroxyl equivalent weight of at least 500 g/mol.
6. The electrodepositable coating composition of any of the preceding Aspects, wherein the polybutylene oxide polymer is present in the electrodepositable coating composition in an amount of 0.1% by weight to 10% by weight based on the total weight of the resin blend solids.
7. The electrodepositable coating composition of any of the preceding Aspects, wherein the electrodepositable coating composition is substantially free of tin.
8. The electrodepositable coating composition of any of the preceding Aspects, wherein the curing agent comprises a blocked polyisocyanate.
9. The electrodepositable coating composition of Aspect 8, wherein the blocked polyisocyanate is at least partially blocked with the polybutylene oxide polymer.
10. The electrodepositable coating composition of any of the preceding Aspects further comprising a polyetheramine-adduct.
11. The electrodepositable coating composition of Aspect 10, wherein the polyetheramine adduct is present in an amount of 3% to 20% by weight based on total weight of resin blend solids.
12. The electrodepositable coating composition of any of the preceding Aspects further comprising a crater control additive present in an amount of less than 50% by weight based on the total weight of the resin blend solids.
13. The electrodepositable coating composition of Aspect 12 wherein the crater control additive comprises a polyamine-dialdehyde adduct comprising a polymerization product of a polyamine and a dialdehyde.
14. The electrodepositable coating composition of Aspect 13, wherein the polyamine comprises a cationic amine-functionalized resin, a polyetheramine, or combinations thereof.
15. The electrodepositable coating composition of any of Aspect 13 or Aspect 14, wherein the dialdehyde comprises glyoxal, glutaraldehyde, or combinations thereof.
16. The electrodepositable coating composition of any of Aspects 13-15 wherein a ratio of the aldehyde functional groups of the dialdehyde to the amino-functional groups of the polyamine is 2:10 to 1:1.
17. The electrodepositable coating composition of any of Aspects 13-15 wherein a ratio of the aldehyde functional groups of the dialdehyde to the amino-functional groups of the polyamine is 2:1 to 20:1.
18. A method of coating a substrate comprising electrophoretically applying the composition of any of Aspects 1 to 17 to at least a portion of the substrate and curing the coating composition to form a coating.
19. A substrate coated with the electrodepositable coating composition of any of Aspects 1 to 17.
20. The substrate of Aspect 19 wherein the thickness of the coating on the substrate is 15 to 30 microns.
21. The substrate of Aspects 19 or 20, wherein crater depth of the coating on the substrate as measured by a Mitutoyo Surftest SJ-402 stylus profilometer is reduced by at least 10%, such as at least 20%, such as at least 30%, such as at least 40%, such as at least 50%, such as at least 100%, compared to a substrate coated with a comparative coating composition that does not include the polybutylene oxide polymer.
22. The substrate of any of Aspects 19-21, wherein crater depth of the coating on the substrate as measured by a Mitutoyo Surftest SJ-402 stylus profilometer is no more than 8 microns, such as no more than 6 microns, such as no more than 5 microns, such as no more than 4 microns.
23. The substrate of any of Aspects 19-22, wherein the coating on the substrate has an adhesion rating of at least 2, such as at least 4, such as at least 7, as measured by the White Alkyd Adhesion Test.

EXAMPLES

Paint Examples A Through K

Preparation of Cationic Resin A

TABLE 1

| # | Material | Amount (g) |
|---|---|---|
| 1 | DER 732[1] | 640.7 |
| 2 | Bisphenol A | 155.2 |
| 3 | Butyl Carbitol formal[2] | 7.96 |
| 4 | Benzyldimethyl amine | 1.50 |
| 5 | Butyl Carbitol formal[2] | 3.12 |
| 6 | Butyl Carbitol formal[2] | 49.5 |
| 7 | JEFFAMINE D400[3] | 160.5 |
| 8 | Butyl Carbitol formal[2] | 7.96 |
| 9 | Bisphenol A digylcidyl ether[4] | 17.4 |
| 10 | Butyl Carbitol formal[2] | 6.20 |
|  | Resin from reaction product of materials 1-10 | 913.5 |
| 11 | Deionized water | 1065.8 |
| 12 | Lactic Acid (88%) | 47.8 |
| 13 | Ethoxylated coco amine surfactant[5] | 59.3 |
| 15 | Deionized water | 1243.7 |

[1]Aliphatic epoxy resin available from Dow Chemical Co.
[2]Available as MAZON 1651 from BASF Corporation
[3]A polypropylene oxide resin terminated with primary amines available from Huntsman Corp.
[4]Available from Hexion Corporation as EPON 828
[5]Available from Solvay as Rhodameen C5

Charges 1, 2 and 3 were charged into a 3-liter round-bottomed flask fitted with a stirrer and temperature measuring probe and blanketed with $N_2$. The mixture was heated to 130° C. Charges 4 and 5 were mixed together and added to the mixture with the heat off. The mixture exothermed to 135° C. and heat was added as necessary to hold the temperature at 135° C. for approximately two hours. The epoxide equivalent weight was checked every 30 minutes and the increase in epoxide equivalent weight plotted with time. Heating continued at 135° C. for the time extrapolated for the epoxide equivalent weight of the mixture to reach 1,232. The heat was removed, charge 6 was added and the stirring mixture allowed to cool to 100° C. over a period of approximately 20 minutes. Charge 7 was added and immediately followed by charge 8 to rinse the line into the reactor. Following the exotherm, heat was applied to hold the reaction temperature at 95° C. until the Gardner-Holdt viscosity of a sample of resin diluted 50/50 in methoxy propanol was "L". A mixture of charges 9 and 10 were added and the mixture continued to be held at 95° C. until the Gardner-Holdt viscosity of a sample of the resin diluted 50/50 in methoxy propanol was "P-Q". 913.5 g of this resin was poured into a mixture of 1065.8 g of deionized water and 47.8 g of an 88% solution of lactic acid in water at room temperature and mixed for 45 minutes. Charge 13 was added and the mixture stirred for 40 minutes at room temperature. 1243.7 g of deionized water was then added and the mixture stirred for an additional three hours at room temperature. The final aqueous dispersion had a measured solids content of 30.5 percent. The solids content was determined by adding a quantity of the dispersion to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of the examples below.

Preparation of Cationic Resin B

TABLE 2

| # | Material | Amount (g) |
|---|---|---|
| 1 | Bisphenol A diglycidyl ether[1] | 241.1 |
| 2 | Bisphenol A | 73.5 |
| 3 | Butyl Carbitol formal[2] | 35.1 |
| 4 | Ethyl triphenyl phosphonium iodide | 0.24 |
| 5 | Butyl Carbitol formal | 60.1 |
| 6 | Jeffamine D2000[3] | 856.8 |
| 7 | Butyl Carbitol formal | 26.1 |
| 8 | Ethoxylated coco amine surfactant [4] | 65.1 |
| 9 | Butyl Carbitol formal | 10.1 |
|   | Resin from reaction product of materials 1-9 | 1258.7 |
| 10 | Lactic Acid (88%) | 40.05 |
| 11 | Deionized water | 1288.7 |
| 12 | Deionized water | 287.5 |

[1]Available from Hexion Corporation as Epon 828
[2]Available as MAZON 1651 from BASF Corporation
[3]A polypropylene oxide resin terminated with primary amines available from Huntsman Chemical
[4] Available from Solvay as Rhodameen C5

Charges 1, 2, and 3 were added to a 3-liter round-bottomed flask fitted with a stirrer and temperature measuring probe, and blanketed with $N_2$. The mixture was heated to 125° C. The heat was turned off and charge 4 was added and the reaction mixture allowed to exotherm, with heat added as required to reach 160° C. The reaction mixture was then held at 160-170° C. for 1 hour. The heat was turned off and charge 5 was added and the mixture cooled to 140° C. over a period of approximately 15 minutes. Charge 6 was added over 10 minutes and the line into the reactor rinsed with charge 7. The reaction mixture was allowed to exotherm, reaching its peak temperature over approximately 20 minutes. Heating was restored to the extent needed to increase the reaction temperature to 125-130° C. and then held for 3 hours. Charge 8 was added to the reactor and the line into the reactor were rinsed with charge 9. The mixture was stirred for 15 minutes at 125-130° C. 1258.7 g of this resin was poured into a mixture of 1288.7 g of deionized water and 40.1 g of an 88% solution of lactic acid in water at room temperature and mixed for 45 minutes. 287.5 g of deionized water was then added with continued stirring. The final aqueous dispersion had a measured solids content of 45.0 percent, determined as described previously.

Preparation of Main Film-Forming Cationic Resins

This example describes the preparation of cationic epoxy resins, used as the main film-forming resin, from a mixture of the following ingredients:

Preparation of Crosslinker

TABLE 3

| # | Material | Amount (g) |
|---|---|---|
| 1 | Dibutyltin dilaurate | 1.3 |
| 2 | Ethyleneglycol monobutyl ether | 945.44 |
| 3 | Diethyleneglycol monobutyl ether | 324.46 |
| 4 | Methyl isobutyl ketone (mibk) | 15.52 |
| 5 | Isocyanate[1] | 1340.00 |
| 6 | Methyl isobutyl ketone (mibk) | 307.05 |

[1]Rubinate M, available from Huntsman Corporation

Charges 1, 2, 3 and 4 were added to a 4-neck round bottom flask, fit with a stirrer and temperature measuring probe and blanketed with $N_2$. The temperature was raised to 30° C. Charge 5 was added dropwise over a period of 90 minutes, controlling the rate so that the temperature increases to approximately 80° C. due to the exotherm. After the addition was complete, heat was gently applied to adjust the temperature to 90° C. The mixture was then held at 90° C. for 60 minutes. A sample was drawn and the mixture held at 90° C. for an additional 30 minutes while an I.R. spectrum was taken. No residual isocyanate detected and Charge 6 was added and the mixture allowed to stir at 90° C. for a final 30 minutes.

Preparation of Cationic Resin C

TABLE 4

| # | Material | Amount (g) |
|---|---|---|
| 1 | Bisphenol A diglycidyl ether[1] | 614.68 |
| 2 | Bisphenol A | 265.42 |
| 3 | MACOL 98 A MOD 1[2] | 125.0 |
| 4 | Methylisobutyl ketone (mibk) | 20.5 |
| 5 | Ethyltriphenyl phosphonium iodide | 0.60 |
| 6 | MACOL 98 A MOD 1[2] | 125.0 |
| 7 | Methylisobutyl ketone (mibk) | 85.5 |
| 8 | Crosslinker (see above) | 718.4 |
| 9 | Ketimine[3] | 57.01 |
| 10 | N-methyl ethanolamine | 48.68 |
|   | Resin from reaction product of materials 1-10 | 1854.8 |
| 11 | Sulfamic acid | 40.52 |
| 12 | Deionized water | 1193.2 |
| 13 | Gum rosin solution[4] | 16.5 |
| 14 | Deionized water | 690.0 |
| 15 | Deionized water | 223.3 |
| 16 | Deionized water | 1100.0 |

[1]Epoxy resin available from Hexion Specialty Chemicals as EPON 828
[2]Bisphenol ethylene oxide adduct available from BASF Corporation
[3]MIBK diketimine of diethylene triamine at 72.7% in MIBK
[4]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with $N_2$. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersion had a measured solids content of 42.5 percent, determined as described previously.

Preparation of Cationic Resins D-1 to D-5

Cationic Resins D-1 to D-5 were prepared according to the same procedure as for Cationic Resin C except that various polyols were substituted for the MACOL 98 A MOD 1 (available from BASF Corporation) in charge 6. These polyols are listed in Table 5. As such, each of these polyols are substituted into the resin at a level of 6.6 weight percent of the theoretical level of total solids in Cationic Resin D.

TABLE 5

| Cationic Resin Example | Additive E |
| --- | --- |
| D-1 | Vorapel D3201[1] |
| D-2 | Vorapel T5001[2] |
| D-3 | Voranol B 2000[3] |
| D-4 | Arcol PPG-2000[4] |
| D-5 | Terathane 2000[5] |

[1]Polybutylene oxide polymer diol available from Dow Chemical Company
[2]Polybutylene oxide polymer triol available from Dow Chemical Company
[3]Polybutylene oxide polymer diol available from Dow Chemical Company
[4]Polypropylene glycol polymer diol available from Covestro LLC
[5]Polybutlene glycol polymer diol available from Invista North America S.a.r.l.

TABLE 6

| # | Material | Amount (g) |
| --- | --- | --- |
| 1 | Bisphenol A diglycidyl ether[1] | 614.68 |
| 2 | Bisphenol A | 265.42 |
| 3 | MACOL 98 A MOD 1[2] | 125.0 |
| 4 | Methylisobutyl ketone (mibk) | 20.5 |
| 5 | Ethyltriphenyl phosphonium iodide | 0.60 |
| 6 | Additive E | 125.0 |
| 7 | Methylisobutyl ketone (mibk) | 85.5 |
| 8 | Crosslinker (see above) | 718.4 |
| 9 | Ketimine[3] | 57.01 |
| 10 | N-methyl ethanolamine | 48.68 |
|  | Resin from reaction product of materials 1-10 | 1854.8 |
| 11 | Sulfamic acid | 40.52 |
| 12 | Deionized water | 1193.2 |
| 13 | Gum rosin solution[4] | 16.5 |
| 14 | Deionized water | 690.0 |
| 15 | Deionized water | 223.3 |
| 16 | Deionized water | 1100.0 |

[1]Epoxy resin available from Hexion Specialty Chemicals as EPON 828
[2]Bisphenol ethylene oxide adduct available from BASF Corporation
[3]MIBK diketimine of diethylene triamine at 72.7% in MIBK
[4]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with $N_2$. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersions had a measured solids content of between 36.9 and 38.4 percent solids, determined as described previously.

Preparation of Cationic Resins F-1 to F-5

Cationic Resins F-1 to F-5 were prepared according to the same procedure as for Cationic Resin C except that various polyols were substituted for the MACOL 98 A MOD 1 (available from BASF Corporation) in charge 6. These polyols are listed in Table 7. As such, each of these polyols are substituted into the resin at a level of 3.0 weight percent of the theoretical level of total solids in Cationic Resin D.

TABLE 7

| Cationic Resin Example | Additive E |
| --- | --- |
| F-1 | Vorapel D3201[1] |
| F-2 | Vorapel T5001[2] |
| F-3 | Voranol B 2000[3] |
| F-4 | Arcol PPG-2000[4] |

[1]Polybutylene oxide polymer diol available from Dow Chemical Company
[2]Polybutylene oxide polymer triol available from Dow Chemical Company
[3]Polybutylene oxide polymer diol available from Dow Chemical Company
[4]Polypropylene glycol polymer diol available from Covestro LLC

TABLE 8

| # | Material | Amount (g) |
| --- | --- | --- |
| 1 | Bisphenol A diglycidyl ether[1] | 614.68 |
| 2 | Bisphenol A | 265.42 |
| 3 | MACOL 98 A MOD 1[2] | 193.0 |
| 4 | Methylisobutyl ketone (mibk) | 20.5 |
| 5 | Ethyltriphenyl phosphonium iodide | 0.60 |
| 6 | Additive E | 57.0 |
| 7 | Methylisobutyl ketone (mibk) | 85.5 |
| 8 | Crosslinker (see above) | 718.4 |
| 9 | Ketimine[3] | 57.01 |
| 10 | N-methyl ethanolamine | 48.68 |
|  | Resin from reaction product of materials 1-10 | 1854.8 |
| 11 | Sulfamic acid | 40.52 |
| 12 | Deionized water | 1193.2 |
| 13 | Gum rosin solution[4] | 16.5 |
| 14 | Deionized water | 690.0 |
| 15 | Deionized water | 223.3 |
| 16 | Deionized water | 1100.0 |

[1]Epoxy resin available from Hexion Specialty Chemicals as EPON 828
[2]Bisphenol ethylene oxide adduct available from BASF Corporation
[3]MIBK diketimine of diethylene triamine at 72.7% in MIBK
[4]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with $N_2$. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersions had a measured solids content of between 37.8 and 38.2 percent, determined as described previously.

Paint A—Comparative Example

TABLE 9

| # | Material | Amount (g) |
|---|---|---|
| 1 | Cationic Resin A | 240.7 |
| 2 | Butyl Carbitol formal[1] | 11.0 |
| 3 | Methoxy propanol | 6.2 |
| 4 | Cationic Resin C | 1528.5 |
| 5 | DI water | 252.6 |
|   | Subtotal | 2039.0 |
| 6 | Pigment Paste[2] | 350.9 |
| 7 | DI water | 1610.1 |

[1]Available as MAZON 1651 from BASF Corporation
[2]Pigment paste E6434P available from PPG Industries, Inc.

Charges 1-3 were added sequentially to a plastic container at room temperature under agitation with 10 minutes of stirring after each addition. Charge 4 was added to a separate one gallon plastic container with agitation. The mixture containing charges 1-3 was slowly added to charge 4 followed by 5 minutes of additional stirring. Charge 5 was then added with stirring. The sub-total of charges 1 through 5 represents the total weight of the resin blend. Charge 6 was added and the paint allowed to stir until uniform, a minimum of 30 minutes. Charge 7 was added and the paint allowed to stir until uniform, a minimum of 30 minutes. The resulting cationic electrodepositable paint composition had a solids content of 23.0 percent, determined as described previously, and a pigment to binder ratio of 0.15/1.0 by weight. After 30% ultrafiltration (and reconstitution with deionized water), coated panels were prepared from a bath containing the cationic electrodepositable paint composition and were evaluated for oil spot resistance. The results are reported below.

Paint B—Comparative Example

TABLE 10

| # | Material | Amount (g) |
|---|---|---|
| 1 | Cationic Resin B | 163.7 |
| 2 | Butyl Carbitol formal[1] | 11.0 |
| 3 | Methoxy propanol | 6.2 |
| 4 | Cationic Resin C | 1528.5 |
| 5 | DI water | 330.2 |
|   | Subtotal | 2039.6 |
| 6 | Pigment Paste[2] | 350.9 |
| 7 | DI water | 1610.1 |

[1]Available as MAZON 1651 from BASF Corporation
[2]Pigment paste E6434P available from PPG Industries, Inc.

Charges 1-3 were added sequentially to a plastic container at room temperature under agitation with 10 minutes of stirring after each addition. Charge 4 was added to a separate 1 gallon plastic container with agitation. The mixture containing charges 1-3 was slowly added to charge 4 followed by 5 minutes of additional stirring. Charge 5 was then added with stirring. The sub-total of charges 1 through 5 represents the total weight of resin blend. Charge 6 was added and the paint was allowed to stir until uniform, a minimum of 30 minutes. Charge 7 was added and the paint allowed to stir until uniform, a minimum of 30 minutes. The resulting cationic electrodepositable paint composition had a solids content of 23.0 percent, determined as described previously, and a pigment to binder ratio of 0.15/1.0 by weight. After 25% ultrafiltration (and reconstitution with deionized water), coated panels were prepared from a bath containing the cationic electrodepositable paint composition and were evaluated for oil spot resistance. The results are reported below.

Paints C Through G

TABLE 11

| | | Paint Composition - Amount (g) | | | | |
|---|---|---|---|---|---|---|
| # | Material | C | D | E | F | G |
| 1 | Cationic Resin A | 240.7 | 240.7 | 240.7 | 240.7 | 240.7 |
| 2 | Butyl Carbitol formal[1] | 11.0 | 11.0 | 11.0 | 11.0 | 11.0 |
| 3 | Methoxy propanol | 6.2 | 6.2 | 6.2 | 6.2 | 6.2 |
| 4 | Cationic Resin D-1 | 1709.5 | — | — | — | — |
|   | Cationic Resin D-2 | — | 1719.4 | — | — | — |
|   | Cationic Resin D-3 | — | — | 1709.5 | — | — |
|   | Cationic Resin D-4 | — | — | — | 1693.0 | — |
|   | Cationic Resin D-5 | — | — | — | — | 1733.2 |
| 5 | DI Water | 71.7 | 61.7 | 71.7 | 88.15 | 47.9 |
| 6 | Pigment Paste[2] | 350.9 | 350.9 | 350.9 | 350.9 | 350.9 |
| 7 | DI Water | 1610.1 | 1610.1 | 1610.1 | 1610.1 | 1610.1 |

[1]Available as MAZON 1651 from BASF Corporation
[2]Pigment paste E6364P available from PPG Industries, Inc.

For each paint composition, charges 1-3 were added sequentially to a plastic container at room temperature under agitation with 10 minutes of stirring after each addition. Charge 4 was added to a separate 1 gallon plastic container with agitation. The mixture containing charges 1-3 was slowly added to charge 4 followed by 5 minutes of additional stirring. Charge 5 was then added. The sum of charge 4 and charge 5 was a constant to account for differences in the % solids measured for each of the cationic resins D-1 through D-5 so that the combination of charges 4 and 5 introduced the same amount of weight and percent solids for each paint composition. The sum of charges 1 through 5 represent the total weight of the resin blend. Charge 6 was added and the paint was allowed to stir until uniform, a minimum of 30 minutes. Charge 7 was added and the paint was allowed to stir until uniform, a minimum of 30 minutes. The resulting cationic electrodepositable paint compositions had a solids content of 23.0 percent, determined as described previously, and a pigment to binder ratio of 0.15/1.0 by weight. In each case, the amount of each Additive E in each paint was kept fixed at 5.28 percent by weight of total resin solids.

After 25% ultrafiltration (and reconstitution with deionized water), coated panels were prepared from baths separately containing the cationic electrodepositable paint compositions and were evaluated for oil spot resistance. The results are reported below.

Paints H Through K

TABLE 12

| | | Paint Composition - Amount (g) | | | |
|---|---|---|---|---|---|
| # | Material | H | I | J | K |
| 1 | Cationic Resin A | 240.7 | 240.7 | 240.7 | 240.7 |
| 2 | Butyl Carbitol formal[1] | 11.0 | 11.0 | 11.0 | 11.0 |
| 3 | Methoxy propanol | 6.2 | 6.2 | 6.2 | 6.2 |

TABLE 12-continued

|  |  | Paint Composition - Amount (g) | | | |
|---|---|---|---|---|---|
| # | Material | H | I | J | K |
| 4 | Cationic Resin F-1 | 1709.5 | — | — | — |
|  | Cationic Resin F-2 | — | 1701.9 | — | — |
|  | Cationic Resin F-3 | — | — | 1718.5 | — |
|  | Cationic Resin F-4 | — | — | — | 1715.8 |
| 5 | DI Water | 71.7 | 79.3 | 62.6 | 65.4 |
| 6 | Pigment Paste[2] | 350.9 | 350.9 | 350.9 | 350.9 |
| 7 | DI Water | 1610.1 | 1610.1 | 1610.1 | 1610.1 |

[1]Available as MAZON 1651 from BASF Corporation
[2]Pigment paste E6343P available from PPG Industries, Inc.

Charges 1-3 were added sequentially to a plastic container at room temperature under agitation with 10 minutes of stirring after each addition. Charge 4 was added to a separate 1 gallon plastic container with agitation. The mixture containing charges 1-3 was slowly added to charge 4 followed by 5 minutes of additional stirring. Charge 5 was then added. The sum of charge 4 and charge 5 was a constant to account for differences in the % solids measured for each of the cationic resins F-1 through F-4 so that the combination of charges 4 and 5 introduced the same amount of weight and percent solids for each paint composition. The sum of charges 1 through 5 represent the total weight of the resin blend. Charge 6 was added and the paint was allowed to stir until uniform, a minimum of 30 minutes. Charge 7 was added and the paint was allowed to stir until uniform, a minimum of 30 minutes. The resulting cationic electrodepositable paint compositions had a solids content of 23.0 percent, determined as described previously, and a pigment to binder ratio of 0.15/1.0 by weight. In each case, the amount of each Additive E in each paint was kept fixed at 2.44 percent by weight of total resin solids.

After 25% ultrafiltration (and reconstitution with deionized water), coated panels were prepared from baths separately containing the cationic electrodepositable paint compositions and were evaluated for oil spot resistance. The results are reported below.

Evaluation of Paint Examples A Through K

Oil Spot Contamination Resistance Testing

The above described electrodepositable paint compositions were then electrodeposited onto cold rolled steel test panels, 4×12×0.031 inches, pretreated with CHEMFOS C700/DI. These panels are available from ACT Laboratories of Hillside, Mich. The panels were electrocoated in a manner well known in the art by immersing them into a stirring bath at 30° C. and connecting the cathode of a direct current rectifier to the panel and connecting the rectifier's anode to stainless steel tubing used to circulate cooling water for bath temperature control. The voltage was increased from 0 to a setpoint voltage of 150V over a period of 30 seconds and then held at that voltage for an additional 120 seconds. This combination of time, temperature and voltage provided a cured dry film thickness of 18 microns for the two comparative example paints A and B. Voltage was adjusted either upward or downward from 150V depending upon the film building characteristics of each additive E, to achieve a similar final dry film thickness of 18 microns.

After electrodeposition, the panels were removed from the bath and rinsed vigorously with a spray of deionized water and cured by baking for 25 minutes at 178° C. in an electric oven.

Oil spot contamination resistance testing evaluates the ability of an electrodeposited coating to resist crater formation upon cure. Coatings were tested for oil spot resistance by pre-contamination of the phosphated cold rolled steel panels with oils typically used for chain lubrication in automobile assembly plants. For each coating, before electrodeposition, a separate toothbrush was dipped in one of three oils: Ferrocote 6130 (Quaker Chemical Corporation), LubeCon Series 0 Lubricant (Castrol Industrial North America Inc.) or Molub-Alloy Chain Oil 22 Spray (Castrol Industrial North America Inc.) and the excess oil blotted off with a paper towel. Each oil was gently flicked over a separate panel to give a splattered pattern of small droplets. The oil-spotted test panels were then electrocoated and cured as described above.

Each panel was visually examined for the presence of defects in the cured film. Oil spot test results were tested on a scale of 0 to 10, with 0 being the worst and 10 being the best, and are reported in the following table. A score of 0 means that the electrocoat had mostly de-wetted from the area of the oil droplet on the underlying substrate, leaving a highly visible defect, known as a crater, in the texture of the cured electrocoat film. An increase in score from 0 to 10 represents an increasingly shallower crater which becomes progressively less visible in the texture of the cured electrocoat. A score of 10 means that no change in texture can be observed on the surface of the cured electrocoat film due to the original presence of an oil droplet on the underlying substrate.

TABLE 13

| Crater Testing Results | | | | | |
|---|---|---|---|---|---|
| | | Amount of | | Oil Spot Resistance | | |
| Cationic Epoxy Resin | Additive Type | Additive (% total resin solids) | Paint | Ferrocote 6130 | LubeCon O | Molub-Alloy Chain Oil 22 |
| C | None | — | A | 3 | 6 | 3 |
| C | None | — | B | 3 | 5 | 4 |
| D-1 | Vorapel D3201 | 5.3 | C | 6 | 8 | 8 |
| D-2 | Vorapel T5001 | 5.3 | D | 3 | 5 | 5 |
| D-3 | Voranol B 2000 | 5.3 | E | 6 | 8 | 8 |
| D-4 | Arcol PPG-2000 | 5.3 | F | 3 | 5 | 4 |
| D-5 | Terathane 2000 | 5.3 | G | 3 | 5 | 4 |
| F-1 | Vorapel D3201 | 2.4 | H | 5 | 8 | 7 |
| F-2 | Vorapel T5001 | 2.4 | I | 3 | 5 | 4 |
| F-3 | Voranol B 2000 | 2.4 | J | 6 | 8 | 7 |
| F-4 | Arcol PPG-2000 | 2.4 | K | 3 | 4 | 3 |

Paint A includes Resin A and represents current commercial cationic electrodepositable coating compositions directed to improved crater control. Therefore, any improvement over Paint A would be commercially desirable. As shown in Table 13, Resin B of Paint B only nominally changes crater control over Paint A. However, the addition of two of the polyol additives listed above at a level of 5.3 weight percent on total bath resin solids resulted in significantly improved oil spot contamination resistance as demonstrated by the much reduced visibility of craters in the texture of the cured coating. These polyol additives were the polybutylene oxide polymers Vorapel D3201 and Voranol B 2000. In addition, the addition of either of these additives at a lower level of 2.4 weight percent on total resin solids continued to result in a significant improvement in oil spot contamination resistance as demonstrated by the formation of significantly less visible craters in the cured coating. This result was surprising and not expected.

To provide a more quantitative measure of the oil spot test results, 2 to 4 representative oil spots (i.e., craters) from each panel were scanned using a Mitutoyo Surftest SJ-402 skidless stylus profilometer to examine the topography of crater defects in the cured coating layer. The diamond stylus had a 90° cone tip with a tip radius of 5 μm. The scan length, measuring speed, data sampling interval, and measuring force were 48 mm, 1 mm/s, 5 μm, and 4 mN, respectively. The sampling data was transferred to a personal computer by use of a USB port located on the profilometer, and the raw data profile was run through a Gaussian bandpass filter with a 0.1 mm high frequency cutoff and an 8 mm low frequency cutoff as a baselining filter using, for example, MountainsMap® Profile software. From the scanned profile, the highest point of the crater rim and lowest point of depth of each of the craters were measured on each side of the crater and the difference determined (i.e., the crater depth, Δ, in microns) such that each crater provides two depth measurements. The crater depth measurements for each panel were averaged and are included in the table below. To provide a comparison between the visual inspection in Table 13 and the quantitative measure provided herein, the rating by each method is provided in Table 14 below.

TABLE 14

Crater Testing Results

| Cationic Epoxy Resin | Additive Type | Amount of Additive (% total resin solids) | Paint | Oil Spot Resistance - LubeCon O Rating | Crater Depth Δ, microns |
|---|---|---|---|---|---|
| C | None | — | A | 6 | 17 |
| C | None | — | B | 5 | 8.5 |
| D-1 | Vorapel D3201 | 5.3 | C | 8 | 3 |
| D-2 | Vorapel T5001 | 5.3 | D | 5 | 14 |
| D-3 | Voranol B 2000 | 5.3 | E | 8 | 3 |
| D-4 | Arcol PPG-2000 | 5.3 | F | 5 | 7 |
| D-5 | Terathane 2000 | 5.3 | G | 5 | 11.5 |
| F-1 | Vorapel D3201 | 2.4 | H | 8 | 4 |
| F-2 | Vorapel T5001 | 2.4 | I | 5 | 17 |
| F-3 | Voranol B 2000 | 2.4 | J | 8 | 2 |
| F-4 | Arcol PPG-2000 | 2.4 | K | 4 | 14 |

The value of crater depth is a measure of the degree of perturbation of the electrocoat surface caused by the presence of the oil droplet under the electrocoat. The lower the value, the shallower and less visible is the crater defect in the texture of the cured coating. These results provide quantitative data that measure the improvement in oil spot cratering resistance when the polybutylene oxide polymer is used. These results confirm the qualitative visual inspection data provided above.

Adhesion Testing

White alkyd adhesion testing evaluates the ability of a second cured coating layer to adhere to the underlying cured electrodeposited coating. White alkyd paint, C354-W404, available from PPG Industries, Inc., was reduced to a viscosity of 100 centipoise as measured at 20 rpm by a Brookfield DV-I Prime viscometer fitted with a cone and plate accessory. The reducing solvent was butyl acetate. Cured e-coated test panels were prepared as described above and a wet white alkyd coating was applied using a #55 (0.055 inch diameter wire) wire-wound coating rod, available from R.D. Specialties. After allowing the white alkyd coating to flash for 10 minutes under ambient conditions, the panels were cured by baking horizontally for 30 minutes at 149° C. in an electric oven.

After the panels had cooled to ambient temperature (about 25° C.), they were subjected to a crosshatch test.

The crosshatch test uses a scribing tool with teeth set 2 mm apart which cut the coating system down to metallic substrate. With two such perpendicular cuts, a "cross-hatch" results which is then tested with Scotch 898 tape. Failure constitutes loss of adhesion between the alkyd coating and the electrodeposited coating. Crosshatch adhesion results were tested on a scale of 0 to 10, with 0 being the worst and 10 being the best, and are reported in the following table. A score of 0 indicates that the cured alkyd paint has been completely removed by the tape from within the scribed area. A score between 0 and 10 indicates that progressively less cured alkyd paint is removed by the tape from within the scribed area, paint being typically removed from the corners where two scribed lines intersect. A score of 10 indicates that there is no evidence of cured alkyd paint being removed by the tape from any of the corners where two scribed lines intersect. As used herein, this test is referred to as the "White Alkyd Adhesion Test."

TABLE 14

Adhesion Testing Results

| Cationic Epoxy Resin | Additive | Paint | Amount of Additive (% of total resin blend solids) | White Alkyd Adhesion Test |
|---|---|---|---|---|
| C | none | A | — | 10 |
| C | none | B | — | 0 |
| D-1 | Vorapel D3201 | C | 5.3 | 5 |
| D-2 | Vorapel T5001 | D | 5.3 | 9 |
| D-3 | Voranol B 2000 | E | 5.3 | 2 |
| D-4 | Arcol PPG-2000 | F | 5.3 | 5 |
| D-5 | Terathane 2000 | G | 5.3 | 0 |
| F-1 | Vorapel D3201 | H | 2.4 | 7 |
| F-2 | Vorapel T5001 | I | 2.4 | 9 |
| F-3 | Voranol B 2000 | J | 2.4 | 7 |
| F-4 | Arcol PPG-2000 | K | 2.4 | 7 |

As shown in Table 14, Paint A, which includes Resin A, performed exceptionally well in the adhesion testing. Paint B, which includes Resin B and similar crater control, resulted in a coating having very poor adhesion. The various polyol additives showed significant differences in performance with respect to the adhesion of the second cured coating layer. While the polybutylene oxide polymers Vorapel D3201 and Voranol B 2000 both provided marked improvements in crater control, the coating containing Vorapel D3201 showed a better adhesion performance at a level of 5.3 percent on resin blend solids. Adhesion performance of coatings containing either additive improved as the level was reduced to 2.4 percent on resin solids. Crater control remained excellent for these polybutylene oxide polymers.

These results indicate that the inclusion of the polybutylene oxide polymers, Vorapel D3201 or Voranol B 2000, in a coating composition results in a cured coating having significantly improved crater control and good adhesion.

Paint Example L

Preparation of Cationic Resin G—Main Film Forming Cationic Resin

Since the hydroxyl-functional polybutylene oxide polymers contain hydroxyl-functional end groups, they also react with isocyanate functional groups and therefore, can be substituted for either the ethyleneglycol monobutyl ether or diethyleneglycol monobutyl ether blocking agents used in preparation of the crosslinker described above. In the example below, a hydroxyl-functional polybutylene oxide polymer is incorporated into the crosslinker.

Preparation of Crosslinker

TABLE 15

| # | Material | Amount (g) |
|---|---|---|
| 1 | Dibutyltin dilaurate | 1.3 |
| 2 | Ethyleneglycol monobutyl ether | 885.0 |
| 3 | Diethyleneglycol monobutyl ether | 324.0 |
| 4 | Vorapel D3201[1] | 500.0 |
| 5 | Methyl isobutyl ketone (mibk) | 245.9 |
| 6 | Isocyanate[2] | 1340.00 |
| 7 | Methyl isobutyl ketone (mibk) | 188.4 |

[1]Available from Dow Chemical Company
[2]Rubinate M, available from Huntsman Corporation Charges 1, 2, 3, 4 and 5 were added to a 4-neck round bottom flask, fit with a stirrer and temperature measuring probe and blanketed with $N_2$. The temperature was raised to 30° C. Charge 6 was added dropwise over a period of 90 minutes, controlling the rate so that the temperature increases to approximately 80° C. due to the exotherm. After the addition was complete, heat was gently applied to adjust the temperature to 90° C. The mixture was then held at 90° C. for 60 minutes. A sample was drawn and the mixture held at 90° C. for an additional 30 minutes while an I.R. spectrum was taken. No residual isocyanate was detected and Charge 7 was added and the mixture allowed to stir at 90° C. for a final 30 minutes.

Preparation of Cationic Resin G

TABLE 16

| # | Material | Amount (g) |
|---|---|---|
| 1 | Bisphenol A diglycidyl ether[1] | 614.7 |
| 2 | Bisphenol A | 265.4 |
| 3 | MACOL 98 A MOD 1[2] | 15.0 |
| 4 | Methylisobutyl ketone (mibk) | 18.3 |
| 5 | Ethyltriphenyl phosphonium iodide | 0.60 |
| 6 | MACOL 98 A MOD 1[2] | 125.0 |
| 7 | Methylisobutyl ketone (mibk) | 61.1 |

TABLE 16-continued

| # | Material | Amount (g) |
|---|---|---|
| 8 | Crosslinker (see above) | 776.1 |
| 9 | Ketimine[3] | 57.0 |
| 10 | N-methyl ethanolamine | 48.7 |
|  | Resin from reaction product of materials 1-10 | 1981.8 |
| 11 | Sulfamic acid | 40.5 |
| 12 | Deionized water | 1148.8 |
| 13 | Gum rosin solution[4] | 15.9 |
| 14 | Deionized water | 664.2 |
| 15 | Deionized water | 672.9 |
| 16 | Deionized water | 1100.0 |

[1]Epoxy resin available from Hexion Specialty Chemicals as EPON 828
[2]Bisphenol ethylene oxide adduct available from BASF Corporation
[3]MIEK diketimine of diethylene triamine at 72.7% in MIBK
[4]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with N2. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersion had a measured solids content of 38.0%, determined as described previously.

Paint Example L

TABLE 17

| # | Material | Amount (g) |
|---|---|---|
| 1 | Cationic Resin A | 240.7 |
| 2 | Butyl Carbitol formal[1] | 11.0 |
| 3 | Methoxy propanol | 6.2 |
| 4 | Cationic Resin G | 1754.25 |
| 5 | DI water | 26.89 |
|  | Subtotal | 2039.0 |
| 6 | Pigment Paste[2] | 350.9 |
| 7 | DI water | 1610.1 |

[1]Available as MAZON 1651 from BASF Corporation
[2]Pigment paste E6434P available from PPG Industries, Inc.

Charges 1-3 were added sequentially to a plastic container at room temperature under agitation with 10 minutes of stirring after each addition. Charge 4 was added to a separate one gallon plastic container with agitation. The mixture containing charges 1-3 was slowly added to charge 4 followed by 5 minutes of additional stirring. Charge 5 was then added with stirring. The sub-total of charges 1 through 5 represents the total weight of the resin blend. Charge 6 was added and the paint allowed to stir until uniform, a minimum of 30 minutes. Charge 7 was added and the paint allowed to stir until uniform, a minimum of 30 minutes. The resulting cationic electrodepositable paint composition had a solids content of 23.0 percent, determined by the method described previously, and a pigment to binder ratio of 0.15/1.0 by weight. In this case, the amount of Vorapel D3201 brought into the paint from Cationic Resin G was 5.08 percent by weight of total resin solids.

After 25% ultrafiltration (and reconstitution with deionized water), coated panels were prepared from a bath containing the cationic electrodepositable paint composition and were evaluated for oil spot resistance. The results are reported below.

Oil Spot Contamination Resistance Testing

Using the same method described above, oil spot contamination testing was conducted on Paint Example L and compared to Paint Comparative Example A.

TABLE 18

Crater Test Results

| Cationic Epoxy Resin | Additive Type | Amount of Additive (% total resin solids) | Paint | Oil Spot Resistance | | |
|---|---|---|---|---|---|---|
| | | | | Ferrocote 6130 | LubeCon O | Molub-Alloy Chain Oil 22 |
| C | None | — | A | 3 | 6 | 3 |
| G | Vorapel D3201 in crosslinker | 5.1 | L | 6 | 6 | 8 |

Paint A includes Resin A and represents current commercial cationic electrodepositable coating compositions directed to improved crater control. Therefore, any improvement over Paint A would be commercially desirable. As shown in Table 18, the substitution of a polybutylene oxide polymer (Vorapel D3201) into the crosslinker as a blocking agent at a level of which provides 5.1 weight percent on total bath resin solids resulted in significantly improved oil spot contamination resistance as demonstrated by the significant reduction in the visibility of craters in the texture of the cured coating.

To provide a more quantitative measure of the oil spot test results, 2 to 4 representative craters from each oil spotted panel were scanned using a Mitutoyo Surftest SJ-402 skidless stylus profilometer to examine the topography of crater defects in the cured coating layer. The diamond stylus had a 90° cone tip with a tip radius of 5 µm. The scan length, measuring speed, data sampling interval, and measuring force were 48 mm, 1 mm/s, 5 µm, and 4 mN, respectively. The sampling data was transferred to a personal computer by use of a USB port located on the profilometer, and the raw data profile was run through a Gaussian bandpass filter with a 0.1 mm high frequency cutoff and an 8 mm low frequency cutoff as a baselining filter using, for example, MountainsMap® Profile software. From the scanned profile, the highest point of the crater rim and lowest point of depth of each of the craters were measured on each side of the crater and the difference determined (crater depth, A, in microns) such that each crater provides two crater depth measurements. The results for each panel were averaged and are included in the table below. To provide a comparison between the visual inspection in Table 18 and the quantitative measure provided herein, the rating by each method is provided in Table 19 below.

TABLE 19

Crater Test Results

| Cationic Epoxy Resin | Additive Type | Amount of Additive (% total resin solids) | Paint | Oil Spot Resistance - LubeCon O | |
|---|---|---|---|---|---|
| | | | | Rating | Crater Depth Δ, microns |
| C | None | — | A | 6 | 17 |
| G | Vorapel D3201 in crosslinker | 5.1 | L | 6 | 5 |

These results provide quantitative data that measure the improvement in oil spot cratering resistance when the polybutylene oxide polymer is used as a blocking agent for the crosslinker.

Adhesion Testing

White alkyd adhesion testing was conducted on Paint Example L according to the White Alkyd Adhesion Test described above and compared to the results of Comparative Paint Examples A and B.

TABLE 20

Adhesion Results

| Cationic Epoxy Resin | Additive | Paint | Amount of Additive (% total resin blend solids) | White Alkyd Adhesion Test |
|---|---|---|---|---|
| C | none | A | — | 10 |
| C | none | B | — | 0 |
| G | Vorapel D3201 in crosslinker | L | 5.1 | 8 |

As shown in Table 20, Paint A, which includes Resin A, performed exceptionally well in the adhesion testing. Paint B, which includes Resin B and similar crater control, resulted in a coating having very poor adhesion. The introduction of a polybutylene oxide polymer (Vorapel D3201) into the coating composition through incorporation into the crosslinker maintained a high level of adhesion performance while providing enhanced crater control.

These results indicate that the inclusion of a polybutylene oxide polymer into the crosslinker as a blocking agent in a coating composition results in a cured coating having significantly improved crater control and good adhesion.

Paint Examples M and N

Preparation of Cationic Resins H-1 and H-2: Main Film-Forming Resins

This example describes the preparation of additional cationic epoxy resins, used as the main film-forming resins, from a mixture of the following ingredients:

Preparation of Crosslinker

TABLE 21

| # | Material | Amount (g) |
|---|---|---|
| 1 | Dibutyltin dilaurate | 1.3 |
| 2 | Ethyleneglycol monobutyl ether | 945.44 |
| 3 | Diethyleneglycol monobutyl ether | 324.46 |
| 4 | Methyl isobutyl ketone (mibk) | 15.52 |
| 5 | Isocyanate[1] | 1340.00 |
| 6 | Methyl isobutyl ketone (mibk) | 307.05 |

[1]Rubinate M, available from Huntsman Corporation

Charges 1, 2, 3 and 4 were added to a 4 neck round bottom flask, fit with a stirrer and temperature measuring probe and blanketed with N2. The temperature was raised to 30° C. Charge 5 was added dropwise over a period of 90 minutes, controlling the rate so that the temperature increases to approximately 80° C. due to the exotherm. After the addition was complete, heat was gently applied to adjust the temperature to 90° C. The mixture was then held at 90° C. for 60 minutes. A sample was drawn and the mixture held at 90° C. for an additional 30 minutes while an I.R. spectrum was taken. No residual isocyanate detected and Charge 6 was added and the mixture allowed to stir at 90° C. for a final 30 minutes.

Preparation of Cationic Resins H-1 and H-2

TABLE 22

| # | Material | Resin H-1 Amount, g | Resin H-2 Amount, g |
|---|---|---|---|
| 1 | Bisphenol A diglycidyl ether[1] | 614.68 | 614.68 |
| 2 | Bisphenol A | 265.42 | 265.42 |
| 3 | MACOL 98 A MOD 1[2] | 191.1 | 226.0 |
| 4 | Methylisobutyl ketone (mibk) | 21.9 | 22.6 |
| 5 | Ethyltriphenyl phosphonium iodide | 0.60 | 0.6 |
| 6 | Vorapel D3201[3] | 58.9 | 24.0 |
| 7 | Methylisobutyl ketone (mibk) | 84.2 | 83.5 |
| 8 | Crosslinker (see above) | 718.4 | 718.4 |
| 9 | Ketimine[4] | 57.01 | 57.01 |
| 10 | N-methyl ethanolamine | 48.68 | 48.68 |
|  | Resin from reaction product of materials 1-10 | 1854.8 | 1854.8 |
| 11 | Sulfamic acid | 40.52 | 40.52 |
| 12 | Deionized water | 1193.2 | 1193.2 |
| 13 | Gum rosin solution[5] | 16.5 | 16.5 |
| 14 | Deionized water | 690.0 | 690.0 |
| 15 | Deionized water | 699.1 | 699.1 |
| 16 | Deionized water | 1100.0 | 1100.0 |

[1]Epoxy resin available from Hexion Specialty Chemicals as EPON 828
[2]Bisphenol ethylene oxide adduct available from BASF Corporation
[3]Hydrophobic polyol available from Dow Chemical Co.
[4]MIBK diketimine of diethylene triamine at 72.7% in MIBK
[5]30% by weight solution of gum rosin in diethylene glycol mono butyl ether formal Charges 1, 2, 3, 4 and 5 were charged to a 4-neck round bottom flask, fitted with a stirrer and temperature measuring probe and blanketed with N2. The mixture was heated to 130° C. The mixture was allowed to exotherm to about 150° C. The temperature was allowed to drop to 145° C., and the mixture was held at this temperature for 2 hours. Charge 6 was added while allowing the mixture to cool to 125° C. and then charge 7 was added. Charges 8, 9 and 10 were added and the mixture was held at 122° C. for two hours. 1,854.8 g of this resin was poured into a mixture of 1193.2 g of deionized water, 40.52 g sulfamic acid and 16.5 g of gum rosin solution at room temperature and mixed for 45 minutes. Charge 14 was added with stirring over about 30 minutes. Charge 15 was added and mixed for a further 30 minutes. Charge 16 was added and mixed for approximately 15 minutes. Then, about 1,100 g of water and solvent were distilled off under vacuum at 60-65° C. The final aqueous dispersion had a measured solids content of 38.0%, determined as described previously. Cationic resins H-1 and H-2 contained 3.10% and 1.26% polybutylene oxide polymer (Vorapel D3201) on resin solids, respectively.

Preparation of a Polyamine-Dialdehyde Adduct

Part A—Preparation of a cationic amine-functionalized resinous dispersion: A general procedure for making a cationic amine-functionalized resinous dispersion for use as a polyamine in preparing a polyamine-dialdehyde adduct was performed as follows:

TABLE 23

| # | Material | Amount (g) |
|---|---|---|
| 1 | Epon 828 | 376.0 |
| 2 | Bisphenol A | 148.3 |
| 3 | Bisphenol A - ethylene oxide adduct (1/6 molar ratio) | 5.2 |
| 4 | Methyl isobutyl ketone | 15.2 |
| 5 | Butylcarbitol formal | 59.6 |
| 6 | Ethyl triphenyl phosphonium iodide | 0.52 |
| 7 | Diethylene triamine ketimine | 235.9 |
| 8 | Methyl isobutyl ketone | 9.8 |
| 9 | Methyl ethanol amine | 0.1 |
| 10 | Methyl isobutyl ketone | 2.1 |

Charges 1 through 6 were added to a flask set up for total reflux with stirring under nitrogen. The mixture was heated to a temperature of 121° C. and was allowed to exotherm (180° C. maximum). The mixture was held for 1 hour and then allowed to cool to 112° C. At a temperature of 112° C., charge 7 was added quickly with a rinse of charge 8. Charge 9 was then added followed by a rinse of charge 10. The mixture was then held at 125° C. for two hours.

724.8 grams of the resulting mixture was then poured into a pre-mixed mixture of deionized water (256.5 g) and glacial acetic acid (31.8 g) and the dispersion was stirred for 1 hour. More deionized water (675.4 g) was then added to the dispersion. Methyl isobutyl ketone was then removed from the dispersion under vacuum at a temperature of 60-70° C.

The solids content and pH of the resulting cationic amine-functionalized resinous dispersion were then determined. The solids content was determined by adding a quantity of the dispersion to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of the examples below. The resulting cationic amine-functionalized resinous dispersion had a solids content of 33.93% and a pH of about 8 as measured by a Metrohm titrator.

A cationic amine-functionalized resinous dispersion prepared as generally described above was subjected to a pH adjustment according to the following procedure:

TABLE 24

| # | Material | Amount (g) |
|---|---|---|
| 1 | Cationic amine-functionalized resinous dispersion[1] | 4350.3 |
| 2 | Deionized Water | 3149.7 |
| 3 | 90% Formic Acid[2] | 74.4 |

[1]Prepared according to the process described above
[2]Available from, for example, BASF Charges 1 and 2 were charged into a beaker and charge 3 was added slowly to the mixture with stirring over about one minute to adjust the pH of the dispersion to about 6.5 as measured by a Metrohm titrator. The cationic amine-functionalized resinous dispersion had a solids content of 20.4%.

Part B—Preparation of Polyamine-Dialdehyde Adduct (6.5:10 Ratio of Aldehyde to Primary Amine): The polyamine-dialdehyde adduct was prepared as follows:

TABLE 25

| # | Material | Amount (g) |
|---|---|---|
| 1 | Cationic amine-functionalized resinous dispersion of Part A | 7452.5 |
| 2 | 40% Glyoxal solution[1] | 147.5 |

[1]40% solution of glyoxal in water available from Aldrich Chemical Company

Charge 1 was charged into a flask with stirring. Charge 2 was added into the flask quickly over about 30 seconds. The reaction mixture had a 6.5:10 ratio of aldehyde functional groups (from glyoxal) to primary amine functional groups (from the cationic resin). The mixture was stirred for 1 hour at room temperature (about 25° C.). The mixture was then heated to 80° C. and held at that temperature with stirring for 2 hours. The mixture was then allowed to cool with stirring to a temperature of 40° C. over 3 hours and was then poured into a container. The resulting dispersion had a solids content of 20.59%.

Paint Examples M and N

TABLE 26

| | | Paint Composition - Amount (g) | |
|---|---|---|---|
| # | Material | M | N |
| 1 | Cationic Resin A | 240.7 | 240.7 |
| 2 | Butyl Carbitol formal[1] | 11.0 | 11.0 |
| 3 | Methoxy propanol | 6.2 | 6.2 |
| 4 | Cationic Resin H-1 | 1632.21 | — |
|   | Cationic Resin H-2 | — | 1670.84 |
| 5 | Polyamine-Dialdehyde Adduct described above | 143.92 | 71.96 |
| 6 | DI Water | 5.01 | 38.34 |
| 7 | Pigment Paste[2] | 350.9 | 350.9 |
| 8 | DI Water | 1610.1 | 1610.1 |

[1]Available as MAZON 1651 from BASF Corporation
[2]Pigment paste E6343P available from PPG Industries, Inc.

Charges 1-3 were added sequentially to a plastic container at room temperature under agitation with 10 minutes of stirring after each addition. Charge 4 was added to a separate 1 gallon plastic container with agitation. The mixture containing charges 1-3 was slowly added to charge 4 followed by 5 minutes of additional stirring. Charge 5 was preblended with charge 6 and then added to the mixture of charges 1-4 and stirred for 5 minutes. The sum of charges 4, 5 and charge 6 were a constant to account for differences in the % solids associated with Charge 4 and the polyamine-dialdehyde adduct so that the combination of charges 4, 5 and 6 introduced the same amount of weight and % solids for each paint composition. The sum of charges 1 through 6 represents the total weight of the resin blend. Charge 7 was added and the paint was allowed to stir until uniform, a minimum of 30 minutes. Charge 8 was added and the paint was allowed to stir until uniform, a minimum of 30 minutes. The resulting cationic electrodepositable paint composition had a solids content of 23 percent as measured by the method described previously and a pigment to binder ratio of 0.15/1.0 by weight. Paint M contains 4% by weight of the polyamine-dialdehyde adduct as an additive on resin blend solids. Paint M also contains 2.5% by weight of Vorapel D3201 on total resin solids, brought in through Cationic Resin H-1. Paint N contains 2% by weight of the polyamine-dialdehyde adduct as an additive on resin blend solids and 1% by weight of Vorapel D3201 on total resin solids, brought in through Cationic Resin H-2.

After 30% ultrafiltration (and reconstitution with deionized water), coated panels were prepared from baths separately containing the cationic electrodepositable paint compositions and were evaluated for oil spot resistance. The results are reported below.

Oil Spot Contamination Resistance Testing

TABLE 27

| | | | | | | |
|---|---|---|---|---|---|---|
| | | Crater Test Results | | | | |
| | | Amount of Additive | Polyamine-Dialdehyde Adduct | | Oil Spot Resistance - LubeCon O | |
| Cationic Epoxy Resin | Additive Type | (% resin blend solids) | (% of resin blend solids) | Paint | Rating | Crater Depth Δ, microns |
| C | None | — | — | A | 6 | 17 |
| C | None | — | — | B | 5 | 8.5 |

TABLE 27-continued

Crater Test Results

| Cationic Epoxy Resin | Additive Type | Amount of Additive (% resin blend solids) | Polyamine-Dialdehyde Adduct (% of resin blend solids) | Paint | Oil Spot Resistance - LubeCon O Rating | Crater Depth Δ, microns |
|---|---|---|---|---|---|---|
| H-1 | Vorapel D3201 | 2.4 | 4 | M | 9 | 0 |
| H-2 | Vorapel D3201 | 1.0 | 2 | N | 6 | 4 |

The value of crater depth is a measure of the degree of perturbation of the electrocoat surface by the presence of the oil droplet under the electrocoat. The lower the value, the less evidence of a crater defect visible in the texture of the cured coating.

Adhesion Testing

White alkyd adhesion testing was conducted on Paint Examples M and N according to the White Alkyd Adhesion Test described above and compared to the results of Comparative Paint Examples A and B.

TABLE 28

Adhesion Testing Results

| Cationic Epoxy Resin | Additive Type | Amount of Additive (% total resin solids) | Polyamine-Dialdehyde Adduct (% of resin blend solids) | Paint | White Alkyd Adhesion Test |
|---|---|---|---|---|---|
| C | None | — | — | A | 10 |
| C | None | — | — | B | 0 |
| H-1 | Vorapel D3201 | 2.4 | 4 | M | 7 |
| H-2 | Vorapel D3201 | 1.0 | 2 | N | 7 |

As shown above, Paint A, which includes Resin A, performed exceptionally well in the adhesion testing but poorly with respect to crater control. In contrast, Paint B, which includes Resin B, showed improved crater control over Paint A but very poor adhesion. The introduction of a polybutylene oxide polymer (Vorapel D3201) in combination with the polyamine-dialdehyde adduct in the coating composition resulted in a coating having reduced crater size with a high level of adhesion. Additionally, the incorporation of the polyamine-dialdehyde adduct allowed for excellent performance while using less polybutylene oxide polymer.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising:
a polybutylene oxide polymer comprising a copolymer of butylene oxide and propylene oxide;
an ionic film-forming polymer having functional groups; and
a curing agent that is reactive with functional groups on the film-forming polymer.

2. The electrodepositable coating composition of claim 1, wherein the molar ratio of butylene oxide to propylene oxide of the copolymer is at least 1:1.

3. The electrodepositable coating composition of claim 1, wherein the polybutylene oxide polymer comprises at least two hydroxyl functional groups.

4. The electrodepositable coating composition of claim 1, wherein the polybutylene oxide polymer has a hydroxyl equivalent weight of at least 500 g/mol.

5. The electrodepositable coating composition of claim 1, wherein the polybutylene oxide polymer is present in the electrodepositable coating composition in an amount of 0.1% by weight to 10% by weight based on the total weight of the resin blend solids.

6. The electrodepositable coating composition of claim 1, wherein the electrodepositable coating composition is substantially free of tin.

7. The electrodepositable coating composition of claim 1, wherein the curing agent comprises a blocked polyisocyanate.

8. The electrodepositable coating composition of claim 7, wherein the blocked polyisocyanate is at least partially blocked with the polybutylene oxide polymer as a blocking agent.

9. The electrodepositable coating composition of any of claim 1 further comprising a polyetheramine-adduct.

10. The electrodepositable coating composition of claim 9, wherein the polyetheramine adduct is present in an amount of 3% to 20% by weight based on total weight of the resin blend solids.

11. The electrodepositable coating composition of claim 1 further comprising a polyamine-dialdehyde adduct comprising a polymerization product of a polyamine and a dialdehyde.

12. The electrodepositable coating composition of claim 11, wherein the polyamine comprises a cationic amine-functionalized resin, a polyetheramine, or combinations thereof.

13. The electrodepositable coating composition of claim 11, wherein the dialdehyde comprises glyoxal, glutaraldehyde, or combinations thereof.

14. The electrodepositable coating composition of claim 11, wherein a ratio of aldehyde functional groups of the dialdehyde to amino-functional groups of the polyamine is 2:10 to 1:1.

15. The electrodepositable coating composition of claim 11, wherein a ratio of the aldehyde functional groups of the dialdehyde to the amino-functional groups of the polyamine is 2:1 to 20:1.

16. A method of coating a substrate comprising electrophoretically applying the electrodepositable coating composition of claim 1 to at least a portion of the substrate and at least partially curing the coating composition to form a coating.

17. A substrate coated with the electrodepositable coating composition of claim 1 in an at least partially cured state.

18. The substrate of claim 17, wherein a crater depth of the coating on the substrate as measured by a Mitutoyo Surftest SJ-402 stylus profilometer is reduced by at least 10% compared to a comparative coating composition that does not include the polybutylene oxide polymer.

19. The substrate of claim 17, wherein the coating on the substrate has an adhesion rating of at least 2, as measured by the White Alkyd Adhesion Test.

20. The electrodepositable coating composition of claim 1, wherein a crater depth of a coating on a substrate coated with the electrodepositable coating composition in an at least partially cured state is reduced by at least 10% compared to a comparative coating composition that does not include the polybutylene oxide polymer, as measured by a Mitutoyo Surftest SJ-402 stylus profilometer.

21. The electrodepositable coating composition of claim 1, wherein a coating on a substrate coated with the electrodepositable coating composition in an at least partially cured state has an adhesion rating of at least 2, as measured by the White Alkyd Adhesion Test.

22. The method of claim 16, wherein a crater depth of the coating on the substrate as measured by a Mitutoyo Surftest SJ-402 stylus profilometer is reduced by at least 10% compared to a comparative coating composition that does not include the polybutylene oxide polymer.

23. The method of claim 16, wherein the coating on the substrate has an adhesion rating of at least 2, as measured by the White Alkyd Adhesion Test.

* * * * *